US011860556B2

(12) United States Patent
Uneme et al.

(10) Patent No.: US 11,860,556 B2
(45) Date of Patent: Jan. 2, 2024

(54) IMAGE FORMING APPARATUS HAVING DETECTION OF RESIDUAL TONER AMOUNT

(71) Applicant: CANON KABUSHIKI KAISHA, Tokyo (JP)

(72) Inventors: Tetsushi Uneme, Kanagawa (JP); Shinichi Nishida, Kanagawa (JP); Tsuyoshi Ogawa, Tokyo (JP); Masahiro Suetsugu, Kanagawa (JP); Kengo Sakai, Kanagawa (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 17/552,604

(22) Filed: Dec. 16, 2021

(65) Prior Publication Data

US 2022/0206410 A1 Jun. 30, 2022

(30) Foreign Application Priority Data

Dec. 28, 2020 (JP) ................................ 2020-218238

(51) Int. Cl.
*G03G 15/08* (2006.01)

(52) U.S. Cl.
CPC ..... *G03G 15/0848* (2013.01); *G03G 15/0862* (2013.01); *G03G 15/0865* (2013.01); *G03G 15/0855* (2013.01); *G03G 2215/0891* (2013.01); *G03G 2215/0894* (2013.01); *G03G 2215/0897* (2013.01)

(58) Field of Classification Search
CPC ........... G03G 15/0848; G03G 15/0865; G03G 15/0863; G03G 15/0862; G03G 15/0855; G03G 2215/0891; G03G 2215/0894; G03G 2215/0897
See application file for complete search history.

(56) References Cited

U.S. PATENT DOCUMENTS

| | | | | |
|---|---|---|---|---|
| 5,899,597 A * | 5/1999 | Shinohara .......... | G03G 15/0896 399/62 |
| 2005/0201776 A1* | 9/2005 | Askren .............. | G03G 15/0898 399/106 |
| 2006/0198645 A1* | 9/2006 | Yamada ............. | G03G 15/0862 399/148 |
| 2011/0123205 A1* | 5/2011 | Satomura ........... | G03G 15/0856 399/27 |
| 2012/0230708 A1* | 9/2012 | Fujita ................. | G03G 15/0862 399/27 |
| 2015/0355573 A1* | 12/2015 | Jeong ................. | G03G 21/1642 399/58 |

FOREIGN PATENT DOCUMENTS

JP 10-186822 A 7/1998

* cited by examiner

*Primary Examiner* — Arlene Heredia
*Assistant Examiner* — Laura Roth
(74) *Attorney, Agent, or Firm* — Venable LLP

(57) ABSTRACT

An image forming apparatus includes an apparatus body, an image bearing member, and a process unit attached to the apparatus body. The process unit includes a frame including a storage portion configured to store developer, a developer bearing member configured to supply developer to the image bearing member to develop an electrostatic latent image. and a circuit board attached to the frame. The circuit board includes a light emitting portion configured to emit light, and a light receiving portion configured to receive the light emitted from the light emitting portion and having passed through an interior of the storage portion.

23 Claims, 17 Drawing Sheets

Nearly Empty

Low

Mid

Full

IMAGE FORMING APPARATUS HAVING DETECTION OF RESIDUAL TONER AMOUNT

BACKGROUND OF THE INVENTION

Field of the Invention

The present invention relates to an image forming apparatus for forming an image on a recording material.

Description of the Related Art

In general, image forming apparatuses adopting an electrophotographic system form images by transferring a toner image formed on a surface of a photosensitive drum to a transfer material that serves as a transfer medium. A known method for replenishing toner is a process cartridge system in which the photosensitive drum and a developer container are integrated as a process cartridge, and the process cartridge is replaced when toner has been consumed.

Hitherto, a toner residual amount detecting apparatus for detecting a residual amount of toner in a toner cartridge storing toner has been proposed (refer to Japanese Patent Application Laid-Open Publication No. H10-186822). The toner residual amount detecting apparatus provides transparent windows on two walls of the toner cartridge that face each other and form an optical path that passes through the transparent windows between a light emitting portion and a light receiving portion. The optical path that traverses the toner cartridge is either transmitted or blocked according to the residual amount of toner, and the residual amount of toner in the toner cartridge can be detected by measuring the transmission time of the optical path.

According to the image forming apparatus adopting a process cartridge system, a slight gap is formed between the image forming apparatus body and the process cartridge so that the process cartridge can be attached to and detached from the image forming apparatus body. Therefore, if the light emitting portion and the light receiving portion disclosed in Japanese Patent Application Laid-Open Publication No. H10-186822 is provided on the image forming apparatus body, the position of the process cartridge may be displaced from the position of the light emitting portion and the light receiving portion, and detection accuracy of residual amount of toner may be deteriorated thereby.

SUMMARY OF THE INVENTION

According to a first aspect of the present invention, an image forming apparatus includes an apparatus body, an image bearing member on which an image is formed, and a process unit attached to the apparatus body, the process unit including a frame including a storage portion configured to store developer, a developer bearing member configured to supply developer to the image bearing member to develop an electrostatic latent image, the developer bearing member being supported by the frame, and a circuit board attached to the frame, wherein the circuit board includes a light emitting portion configured to emit light, and a light receiving portion configured to receive the light emitted from the light emitting portion and having passed through an interior of the storage portion.

According to a second aspect of the present invention, an image forming apparatus includes an apparatus body, an image bearing member on which an image is formed, and a process unit attached to the apparatus body, the process unit including a frame including a storage portion configured to store developer, a developer bearing member configured to supply developer to the image bearing member to develop an electrostatic latent image, the developer bearing member being supported by the frame, a light emitting portion configured to emit light, and a light receiving portion configured to receive light emitted from the light emitting portion and having passed through an interior of the storage portion. The light emitting portion and the light receiving portion are arranged on a side of a surface, of the frame, that is opposite from a side of the developer bearing member in a direction perpendicular to a longitudinal direction of the developer bearing member.

Further features of the present invention will become apparent from the following description of exemplary embodiments with reference to the attached drawings.

DESCRIPTION OF THE EMBODIMENTS

Hereafter, exemplary embodiments for carrying out the present invention will be described with reference to the drawings.

First Embodiment

Figure 1A:
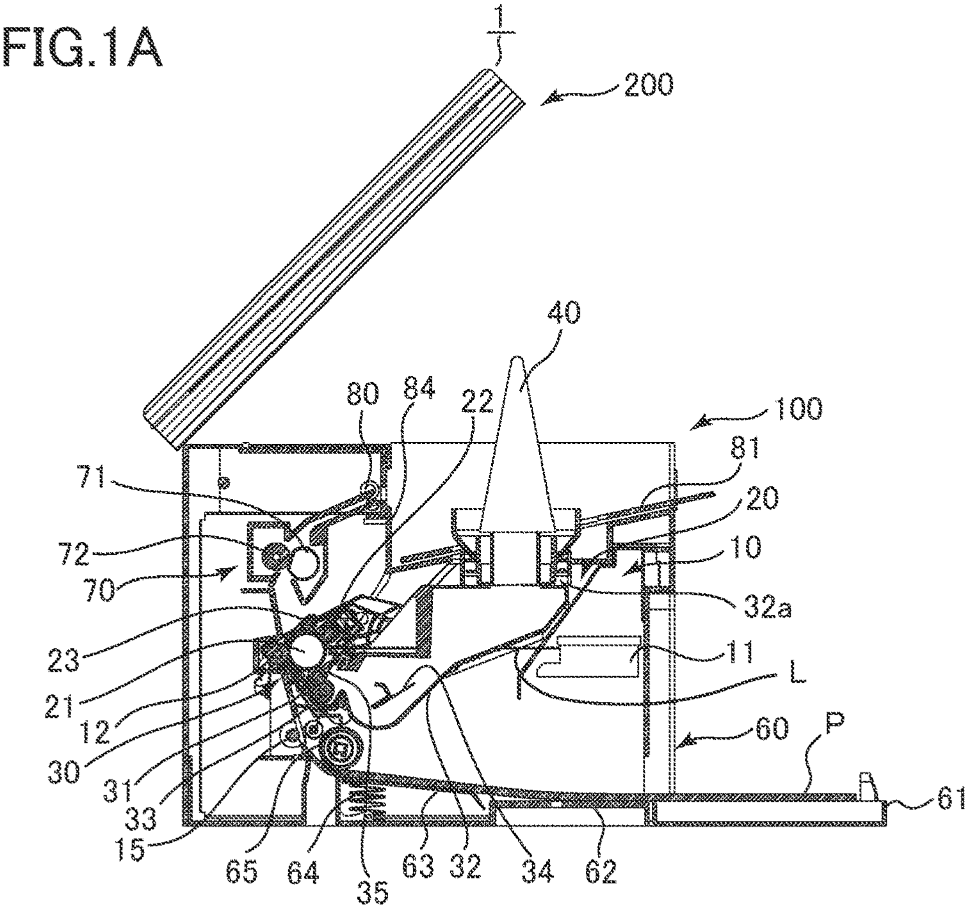
FIG. 1A is a cross-sectional view of an image forming apparatus according to a first embodiment.

FIG. 1A is a schematic drawing illustrating a configuration of an image forming apparatus 1 according to a first embodiment. The image forming apparatus 1 is a monochrome printer that forms an image on a recording material based on image information entered from an external device. The recording material can include paper such as normal paper and thick paper, plastic films such as OHP sheets, sheets having special shapes such as envelopes and index paper, and various other sheet materials of different materials such as cloth.

General Configuration

Figure 1B:
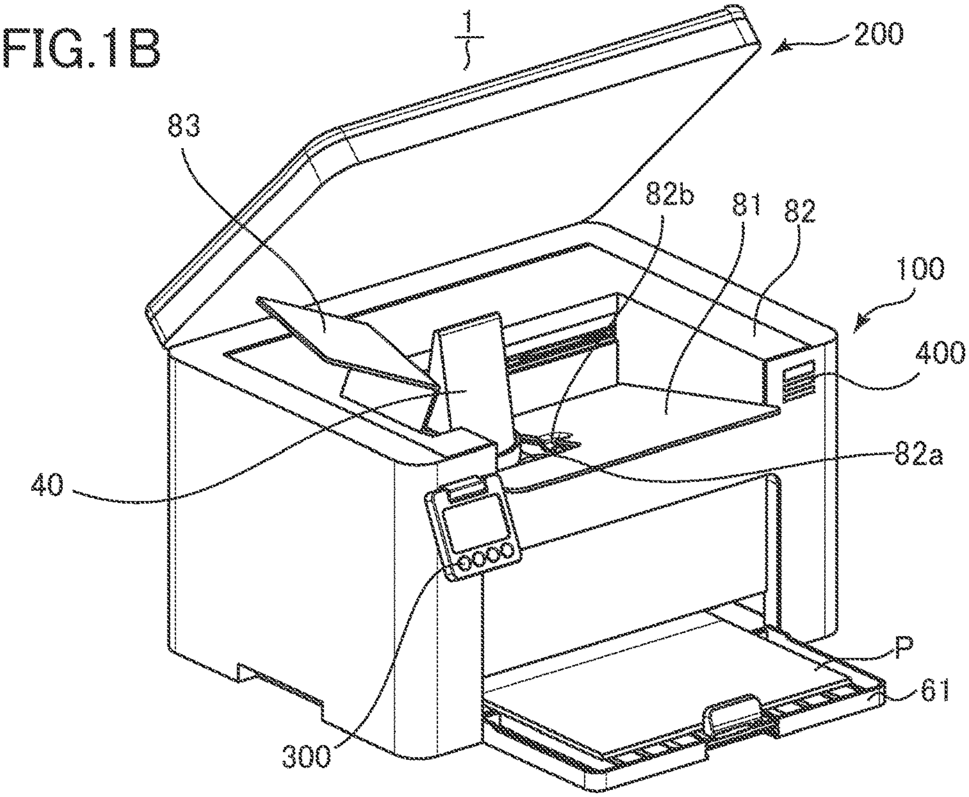
FIG. 1B is a perspective view of the image forming apparatus.

The image forming apparatus 1 includes, as illustrated in FIGS. 1A and 1B, a printer body 100 serving as an apparatus body, a reading unit 200 supported in an openable/closable manner on the printer body 100, and an operation unit 300 attached to an exterior surface of the printer body 100. The printer body 100 includes an image forming unit 10 that forms a toner image on a recording material, a feeding portion 60 for feeding the recording material to the image forming unit 10, a feeding portion 70 that fixes the toner image formed by the image forming unit 10 on the recording material, and a sheet discharge roller pair 80.

Figure 6A:
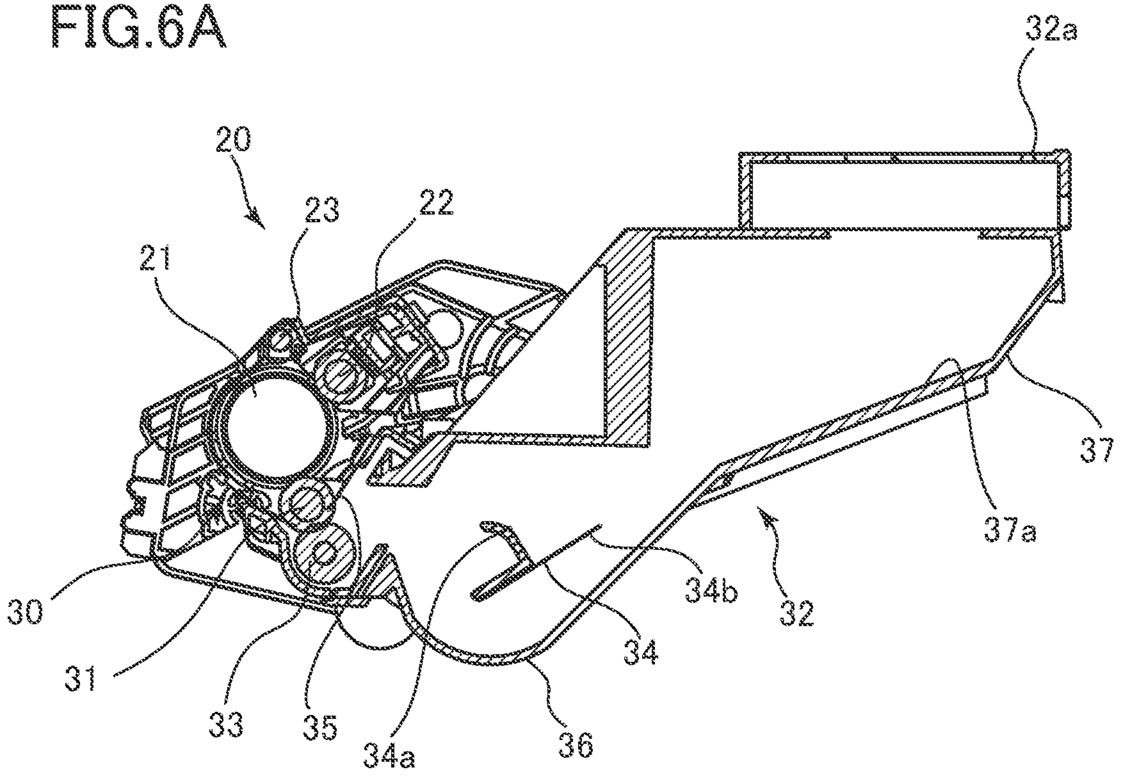
FIG. 6A is a cross-sectional view taken at line 6A-6A of FIG. 5B.
Figure 6B:
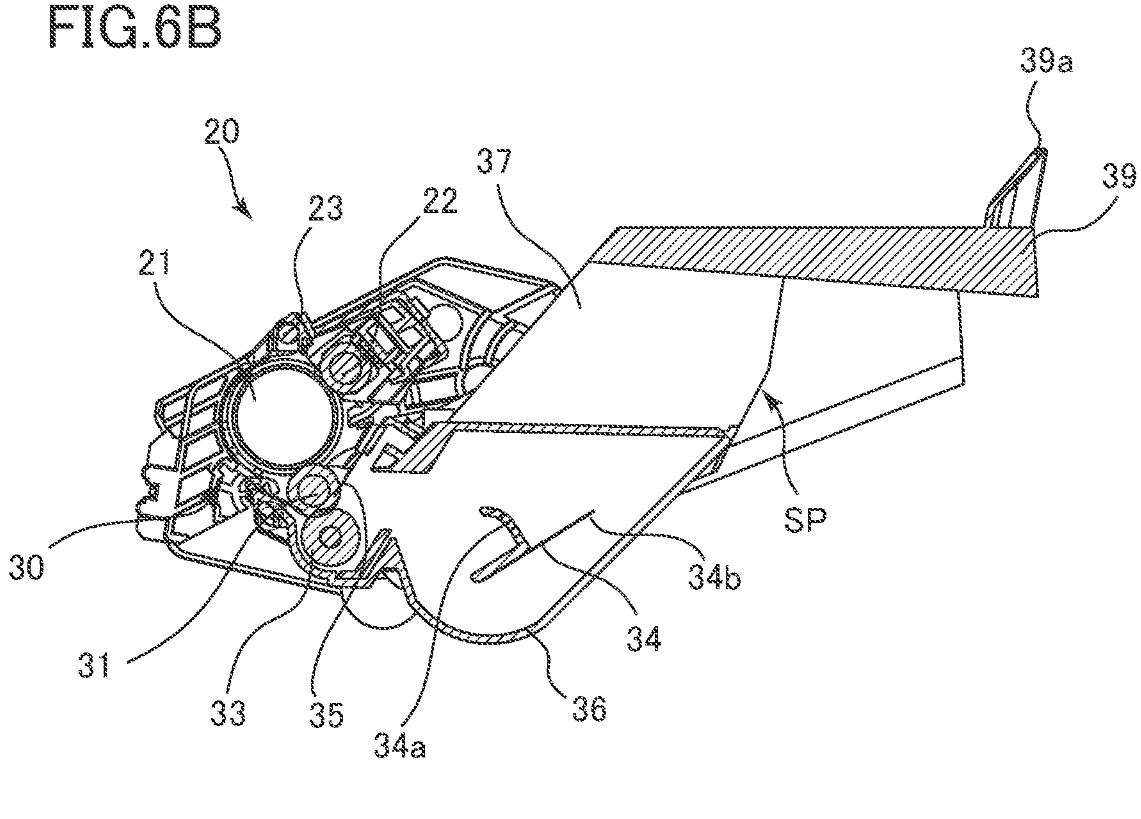
FIG. 6B is a cross-sectional view taken at line 6B-6B of FIG. 5B.

The image forming unit 10 includes a scanner unit 11, a process unit 20 adopting an electrophotographic system, and a transfer roller 12 that transfers a toner image serving as a developer image formed on a photosensitive drum 21 of the process unit 20 to a recording material. As shown in FIGS. 6A and 6B, the process unit 20 includes the photosensitive drum 21, and a charging roller 22, a pre-exposure unit 23, and a developing apparatus 30 including a developing roller 31 arranged in a circumference of the photosensitive drum 21. The process unit 20 is detachably attached to the printer body 100 (refer to FIG. 3). The process unit 20 can be fixed to the printer body 100 by a screw and mainly detached by a service personnel and not by the user. Meanwhile, a structural member of the printer body 100, such as a casing frame of the printer body 100, is not included in the process unit 20.

The photosensitive drum 21 is a photosensitive member formed in a cylindrical shape. The photosensitive drum 21 according to the present embodiment has a photosensitive layer formed of an organic photosensitive member having negative chargeability arranged on a drum-shaped base made of aluminum. The photosensitive drum 21 serving as an image bearing member is driven to rotate at a predetermined processing speed in a predetermined direction, i.e., clockwise direction in the drawing, by a motor.

The charging roller 22 abuts against the photosensitive drum 21 with a predetermined contact pressure and forms a charging portion. Further, the charging roller 22 charges a surface of the photosensitive drum 21 uniformly to a predetermined potential by having a desirable charging voltage applied from a charging high-voltage power supply. In the present embodiment, the photosensitive drum 21 is charged to negative polarity by the charging roller 22. The pre-exposure unit 23 destaticizes the surface potential of the photosensitive drum 21 before it enters the charging portion so as to cause stable discharge at the charging portion.

The scanner unit 11 serving as an exposure unit irradiates laser light corresponding to the image information entered from the external device or the reading unit 200 to the photosensitive drum 21 using a polygon mirror to scan and expose the surface of the photosensitive drum 21. By this exposure, an electrostatic latent image corresponding to the image information is formed on the surface of the photosensitive drum 21. The scanner unit 11 is not limited to a laser scanner device, and for example, an LED exposure device including an LED array in which a plurality of LEDs are arranged along a longitudinal direction of the photosensitive drum 21 can be adopted.

The developing apparatus 30 includes the developing roller 31 serving as a developer bearing member that bears developer, a developer container 32 serving as a frame of the developing apparatus 30, and a feed roller 33 capable of feeding developer to the developing roller 31. The developing roller 31 and the feed roller 33 are supported rotatably by the developer container 32. Further, the developing roller 31 is arranged at an opening portion of the developer container 32 so as to face the photosensitive drum 21. The feed roller 33 is abutted rotatably against the developing roller 31, and toner serving as developer stored in the developer container 32 is applied on a surface of the developing roller 31 by the feed roller 33. The feed roller 33 is not always necessary as long as toner can be sufficiently supplied to the developing roller 31.

The developing apparatus 30 according to the present embodiment adopts a contact development system as the development system. That is, the toner layer toner borne on the developing roller 31 comes into contact with the photosensitive drum 21 at a developing portion, i.e., developing area, at which the photosensitive drum 21 and the developing roller 31 face each other. A developing voltage is applied to the developing roller 31 from a developing high-voltage power supply. The toner borne on the developing roller 31 is transferred under the developing voltage from the developing roller 31 to the drum surface according to a potential distribution on the surface of the photosensitive drum 21, by which the electrostatic latent image is developed as a toner image. Further according to the present embodiment, a reversal development system is adopted. That is, after being charged in the charging step, toner is adhered to the surface area of the photosensitive drum 21 whose electric charge has been attenuated by being exposed during an exposing step, by which a toner image is formed.

According to the present embodiment, toner having a particle diameter of 6 μm and a normal charge polarity of negative polarity is used. One example of toner according to the present embodiment is polymerized toner generated by a polymerization method. Further, the toner according to the present embodiment does not contain magnetic components, and it is a so-called nonmagnetic one-component developer according to which toner is borne on the developing roller 31 mainly by intermolecular force or electrostatic force, i.e., image force. However, one-component developer containing magnetic components can also be used. Further, one-component developer may contain, in addition to toner particles, an additive, such as wax or silica microparticles, for adjusting fluidity or chargeability of toner. Further, a two-component developer composed of nonmagnetic toner and magnetic carrier as developer can also be used. In a case where developer having magnetic property is used, a cylindrical developing sleeve having a magnet arranged on an inner side thereof can be used, for example, as the developer bearing member.

An agitation member 34 is arranged inside the developer container 32. The agitation member 34 is driven to rotate by a motor M1 (refer to FIG. 12) to thereby agitate toner inside the developer container 32 and convey toner toward the developing roller 31 and the feed roller 33. Further, the agitation member 34 serves to circulate toner not used for developing image and detached from the developing roller 31 inside the developer container to uniformize toner inside the developer container. The agitation member 34 is not limited to a rotating type. For example, an agitation member of a swinging type can be adopted. Moreover, another agitation member can also be provided in addition to the agitation member 34.

Further, a developing blade 35 for regulating an amount of toner being borne on the developing roller 31 is arranged at the opening portion of the developer container 32 where the developing roller 31 is arranged. Toner supplied to the surface of the developing roller 31 is formed into a uniform thin layer by passing through the portion opposed to the developing blade 35 along with the rotation of the developing roller 31 and charged to negative polarity by frictional charging.

The feeding portion 60 includes, as illustrated in FIGS. 1A and 1B, a front door 61 supported in an openable/closable manner on the printer body 100, a tray portion 62, a sheet supporting portion 63, a tray spring 64, and a pickup roller 65. The tray portion 62 constitutes a bottom plane of a recording material storage space that is exposed by opening the front door 61, and the sheet supporting portion 63 is supported liftably on the tray portion 62. The tray spring 64 urges the sheet supporting portion 63 upward and presses recording materials P supported on the sheet supporting portion 63 against the pickup roller 65. The front door 61 closes the recording material storage space by being closed against the printer body 100, and supports the recording material P with the tray portion 62 and the sheet supporting portion 63 by being opened with respect to the printer body 100.

The feeding portion 70 adopts a heat fixing system that performs an image fixing process by heating and melting the toner on the recording material. The feeding portion 70 includes a fixing film 71, a fixing heater such as a ceramic heater for heating the fixing film 71, a thermistor for measuring the temperature of the fixing heater, and a pressure roller 72 in pressure contact with the fixing film 71.

Next, an image forming operation of the image forming apparatus 1 will be described. In a state where an image forming command is entered to the image forming apparatus 1, an image forming process by the image forming unit 10 is started based on image information entered from an external computer connected to the image forming apparatus 1 or the reading unit 200. The scanner unit 11 irradiates laser light toward the photosensitive drum 21 based on the entered image information. In this state, the photosensitive drum 21 is charged in advance by the charging roller 22, and an electrostatic latent image is formed on the photosensitive drum 21 by having laser light irradiated thereto. Thereafter, the electrostatic latent image is developed by the developing roller 31, and a toner image is formed on the photosensitive drum 21.

In parallel with the above-mentioned image forming process, the pickup roller 65 of the feeding portion 60 sends out the recording material P supported on the front door 61, the tray portion 62, and the sheet supporting portion 63. The recording material P is fed by the pickup roller 65 to a registration roller pair 15 and abutted against a nip of the registration roller pair 15 by which skewing of the sheet is corrected. Then, the registration roller pair 15 is driven at a matched timing with a transfer timing of the toner image, and conveys the recording material P toward a transfer nip formed by the transfer roller 12 and the photosensitive drum 21.

Transfer voltage is applied from a transfer high-voltage power supply to the transfer roller 12 serving as a transfer unit, and the toner image borne on the photosensitive drum 21 is transferred to the recording material P conveyed by the registration roller pair 15. The recording material P to which toner image has been transferred is conveyed to the feeding portion 70, where the toner image is heated and pressed while the recording material P passes through a nip portion between the fixing film 71 and the pressure roller 72 of the feeding portion 70. Thereby, toner particles are melted and then solidified, by which the toner image is fixed to the recording material P. The recording material P having passed through the feeding portion 70 is discharged to an exterior of the imaging apparatus 1 by the sheet discharge roller pair 80 and supported on a sheet discharge tray 81 formed on an upper portion of the printer body 100.

The sheet discharge tray 81 is inclined upward toward a downstream direction in a discharging direction of the recording material, and the recording material discharged onto the sheet discharge tray 81 slides down on the sheet discharge tray 81 where its trailing edge is aligned by a regulating surface 84.

Figure 4A:
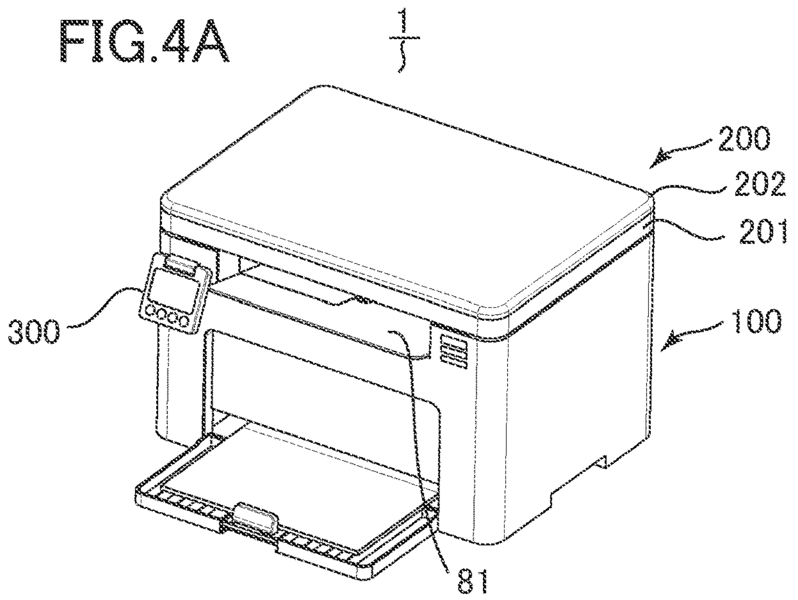
FIG. 4A is a perspective view of the image forming apparatus in a state where a pressure plate of a reading unit is closed.
Figure 4B:
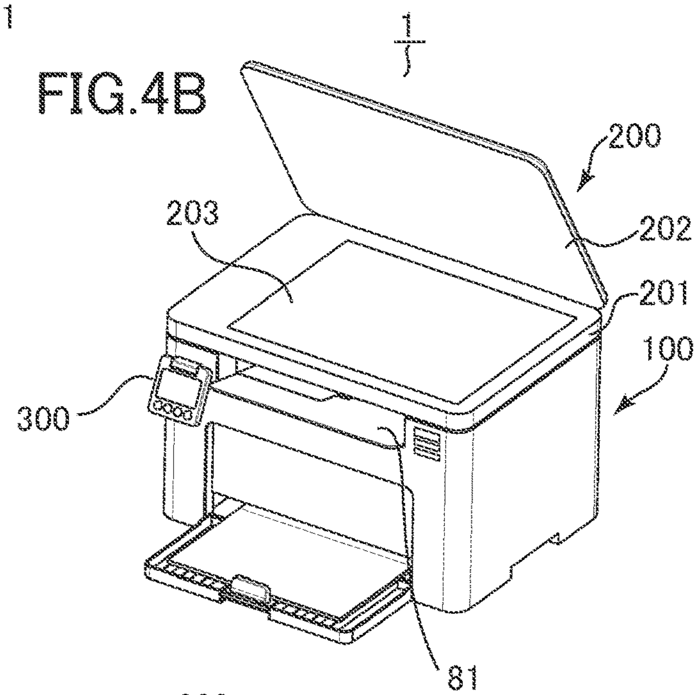
FIG. 4B is a perspective view of the image forming apparatus in a state where the pressure plate of the reading unit is opened.

The reading unit 200 includes, as illustrated in FIGS. 4A and 4B, a reading unit 201 including a reading portion (not shown) arranged in an interior thereof, and a pressure plate 202 supported in an openable/closable manner on the reading unit 201. A platen glass 203 on which a document is placed and through which light emitted from a reading portion is transmitted is arranged on the upper surface of the reading unit 201.

In a case where the document image is to be read by the reading unit 200, the user places the document on the platen glass 203 in a state where the pressure plate 202 is opened. Then, the user closes the pressure plate 202 to prevent misregistration of the document on the platen glass 203 and operates the operation unit 300 to enter a read command to the image forming apparatus 1. When the read operation is started, the reading portion in the reading unit 201 is moved in reciprocating motion in a sub-scanning direction, that is, right and left directions in a state where the operation unit

300 of the image forming apparatus 1 is facing the front. The reading portion emits light toward the document from the light emitting portion and receives the light reflected on the document by a light receiving portion, and the received light is subjected to photoelectric conversion to read the document image. In the following description, front and rear directions, right and left directions and up and down directions are defined based on a state where the operation unit 300 is facing the front.

Figure 2A:
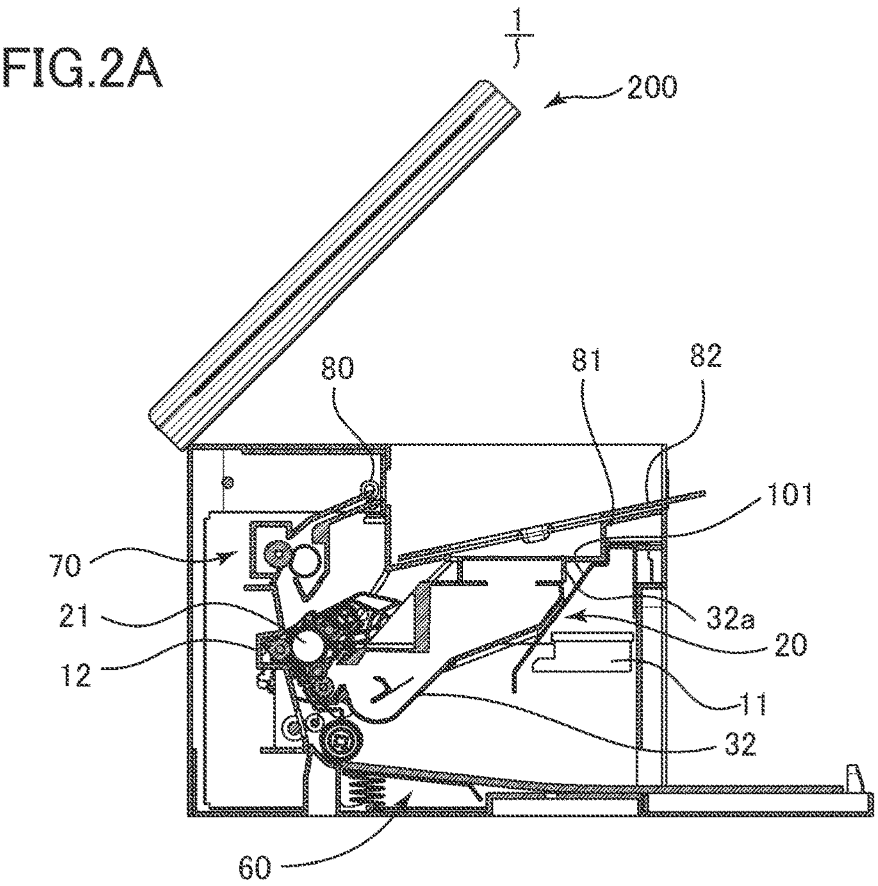
FIG. 2A is a cross-sectional view of the image forming apparatus.
Figure 2B:
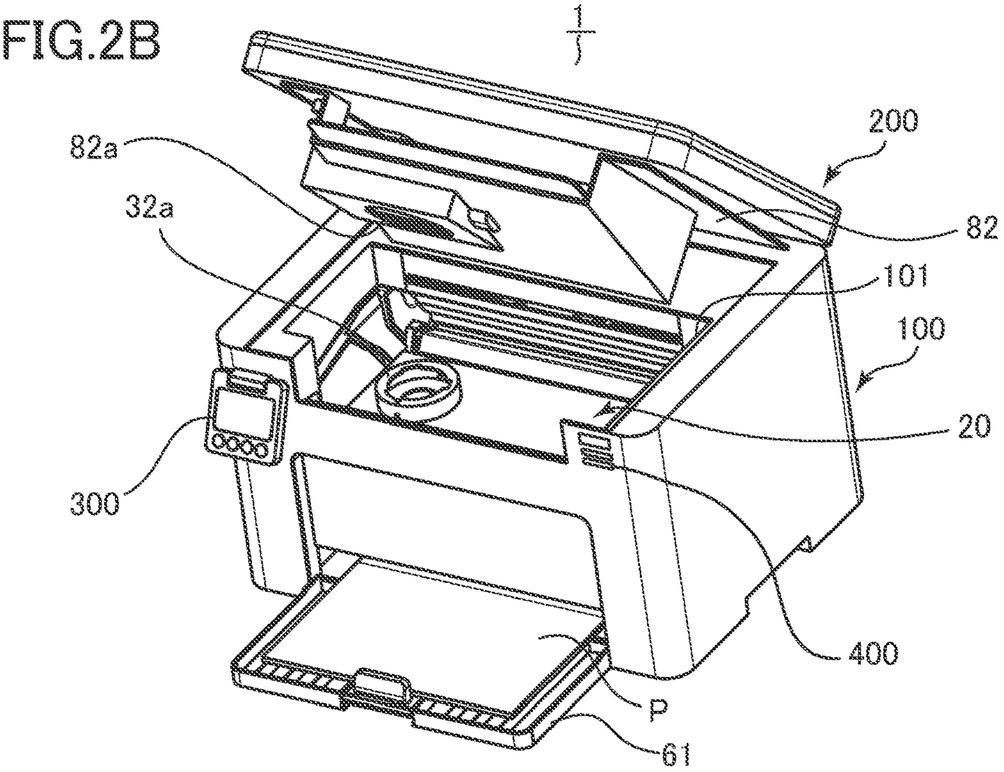
FIG. 2B is a perspective view of the image forming apparatus in a state where a top cover is opened.
Figure 3:
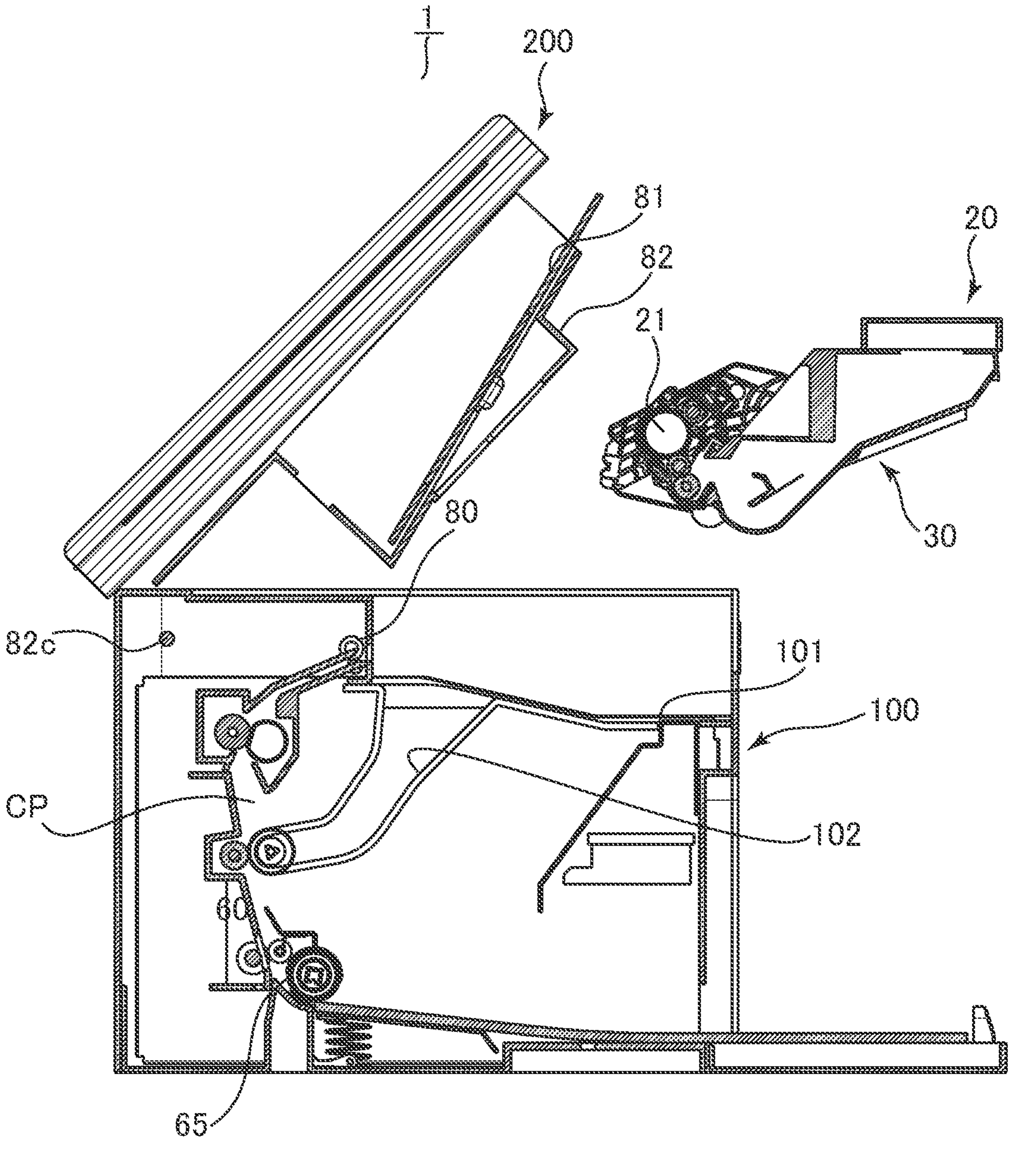
FIG. 3 is a cross-sectional view of the image forming apparatus in a state where a process unit is detached.

As illustrated in FIGS. 2B and 3, a first opening portion 101 that opens upward is formed on the upper portion of the printer body 100, and the first opening portion 101 is covered by a top cover 82. The top cover 82 serving as a loading tray is supported in an openable/closable manner on the printer body 100 about a pivot shaft 82*c* extending in right and left directions, and the sheet discharge tray 81 serving as a supporting surface is formed on the upper plane. The top cover 82 is opened from the front side toward the depth side in a state where the reading unit 200 is opened from the printer body 100. Further, the reading unit 200 and the top cover 82 can be configured to be retained in both the opened state and the closed state by a retaining mechanism such as a hinge mechanism.

For example, if the recording material is jammed by a sheet jam occurring in a conveyance path CP through which the recording material fed by the pickup roller 65 passes, the user opens the reading unit 200 and the top cover 82. Then, the user accesses the process unit 20 through the first opening portion 101 exposed by opening the top cover 82 and pulls out the process unit 20 along a process guide 102. The process guide 102 guides a projection 21*a* (refer to FIG. 5A) arranged on an axial end of the photosensitive drum 21 of the process unit 20 in sliding motion.

In a state where the process unit 20 is drawn out to the exterior through the first opening portion 101, a space is formed through which the user can reach his/her hand into the conveyance path CP. The user reaches his/her hand into the interior of the printer body 100 through the first opening portion 101 and accesses the recording material being jammed in the conveyance path CP to remove the jammed recording material.

Figure 4C:
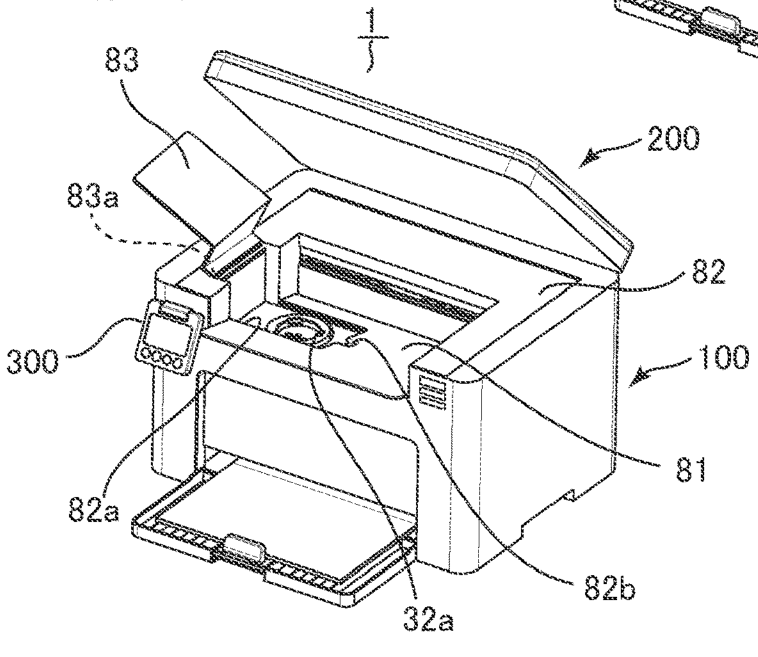
FIG. 4C is a perspective view of the image forming apparatus in a state where the reading unit is opened.

According further to the present embodiment, as illustrated in FIGS. 1B and 4C, an opening/closing member 83 is provided in an openable/closable manner on the top cover 82. A second opening portion 82*a* serving as an opening portion opening upward is formed on the sheet discharge tray 81 of the top cover 82. The opening/closing member 83 is designed movably between a closed position in which a replenishing port 32*a* is covered so that a toner pack 40 cannot be attached to the developer container 32 and an open position in which the replenishing port 32*a* is exposed so that the toner pack 40 can be attached to the developer container 32. The opening/closing member 83 functions as a part of the sheet discharge tray 81 in the closed position. The opening/closing member 83 and the second opening portion 82*a* are formed on a left side of the sheet discharge tray 81. Further, the opening/closing member 83 is supported in an openable/closable manner on the top cover 82 about a pivot shaft 83*a* extending in front and rear directions, and the opening/closing member 83 is opened to the left direction by the user hooking his/her finger on a groove portion 82*b* provided on the top cover 82. Thus, the user can access the replenishing port 32*a* by simply opening the opening/closing member 83. The opening/closing member 83 is formed in an approximately L shape along the configuration of the top cover 82.

The second opening portion 82*a* of the sheet discharge tray 81 is opened so that the replenishing port 32*a* for replenishing toner formed on the upper portion of the developer container 32 is exposed, and by opening the opening/closing member 83, the user can access the replenishing port 32*a* without opening the top cover 82. The present embodiment adopts a system, i.e., direct replenishment system, in which the user replenishes toner to the developing apparatus 30 from the toner pack 40 (refer to FIGS. 1A and 1B) filled with toner for replenishment in a state where the developing apparatus 30 is still attached to the image forming apparatus 1. Therefore, in a state where residual amount of toner in the process unit 20 becomes small, there is no need to remove the process unit 20 from the printer body 100 and replace it with a new process unit, so that usability can be improved. Further, toner can be replenished to the developer container 32 by a lower cost compared to replacing the whole the process unit 20. Costs can also be cut down according to the direct replenishment system compared to a case where only the development apparatus 30 of the process unit 20 is to be replaced, since there is no need to replace the various rollers and gears. The image forming apparatus 1 and the toner pack 40 constitute the image forming system.

Collection of Transfer Residual Toner

The present embodiment adopts a cleanerless configuration in which transfer residual toner remaining on the photosensitive drum 21 without being transferred to the recording material P is collected in the developing apparatus 30 and reused. Transfer residual toner is removed by the following process. Transfer residual toner contains both toner that is charged to positive polarity and toner that is charged to negative polarity but does not have sufficient charge. Transfer residual toner can be charged to negative polarity again by destaticizing the photosensitive drum 21 after transfer by the pre-exposure unit 23 and generating uniform charge by the charging roller 22. Transfer residual toner charged to negative polarity again at the charging portion reaches the developing portion along with the rotation of the photosensitive drum 21. Then, the surface area of the photosensitive drum 21 having passed through the charging portion is exposed by the scanner unit 11 while having transfer residual toner still attached to the surface thereof, and an electrostatic latent image is formed thereon.

Now, the behavior of transfer residual toner having reached the developing portion will be described by referring to an exposed portion and a non-exposed portion of the photosensitive drum 21, respectively. Transfer residual toner attached to a non-exposed portion of the photosensitive drum 21 is transferred to the developing roller 31 by potential difference between a developing voltage and a potential, i.e., dark potential, of the non-exposed portion of the photosensitive drum 21 at the developing portion, and toner is collected in the developer container 32. This is because the developing voltage applied to the developing roller 31 is relatively of positive polarity with respect to the potential of the non-exposed portion, assuming that the normal charge polarity of toner is negative polarity. Toner collected in the developer container 32 is agitated by the agitation member 34 and dispersed in toner contained in the developer container and then borne on the developing roller 31 to be reused in the developing process.

Meanwhile, transfer residual toner attached to the exposed portion of the photosensitive drum 21 remains on the drum surface without being transferred from the photosensitive drum 21 to the developing roller 31 at the developing portion. This is because the developing voltage applied to the developing roller 31 is set to have a potential of negative polarity greater than the potential, i.e., light potential, of the exposed portion assuming that the normal charge polarity of toner is negative polarity. Transfer residual toner remaining on the drum surface is borne on the photosensitive drum 21 and moves to a transfer portion with other toner being transferred from the developing roller 31 to the exposed portion and transferred onto the recording material P at the transfer portion.

As described, the present embodiment adopts a cleanerless configuration in which transfer residual toner is collected in the developing apparatus 30 and reused, but the present embodiment can also adopt a conventional configuration where transfer residual toner is collected using a cleaning blade abutted against the photosensitive drum 21. In that case, transfer residual toner collected by the cleaning blade is collected in a collecting container that is provided independently from the developing apparatus 30. However, by adopting the cleanerless configuration, there is no need to provide an installation space for the collecting container for collecting transfer residual toner, so that the image forming apparatus 1 can be further downsized, and printing costs can be reduced by reusing transfer residual toner.

Configuration of Developer Container and Toner Pack

Figure 5A:
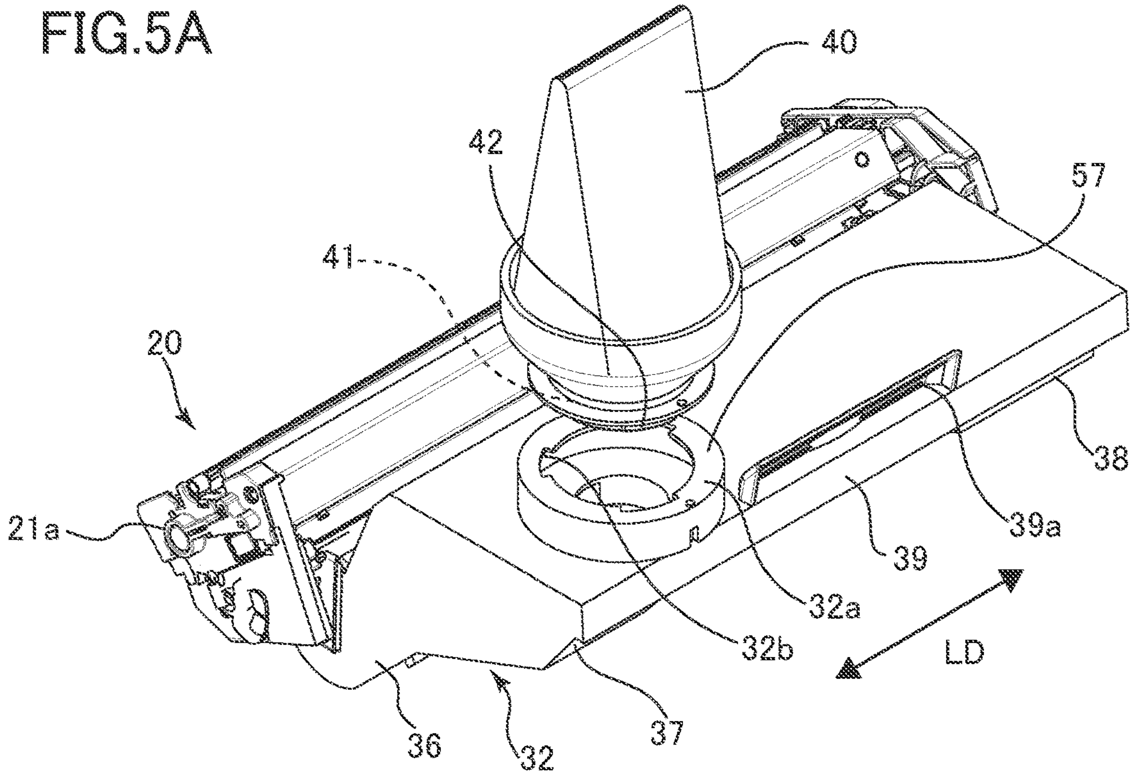
FIG. 5A is a perspective view of a developer container and a toner pack.
Figure 5B:
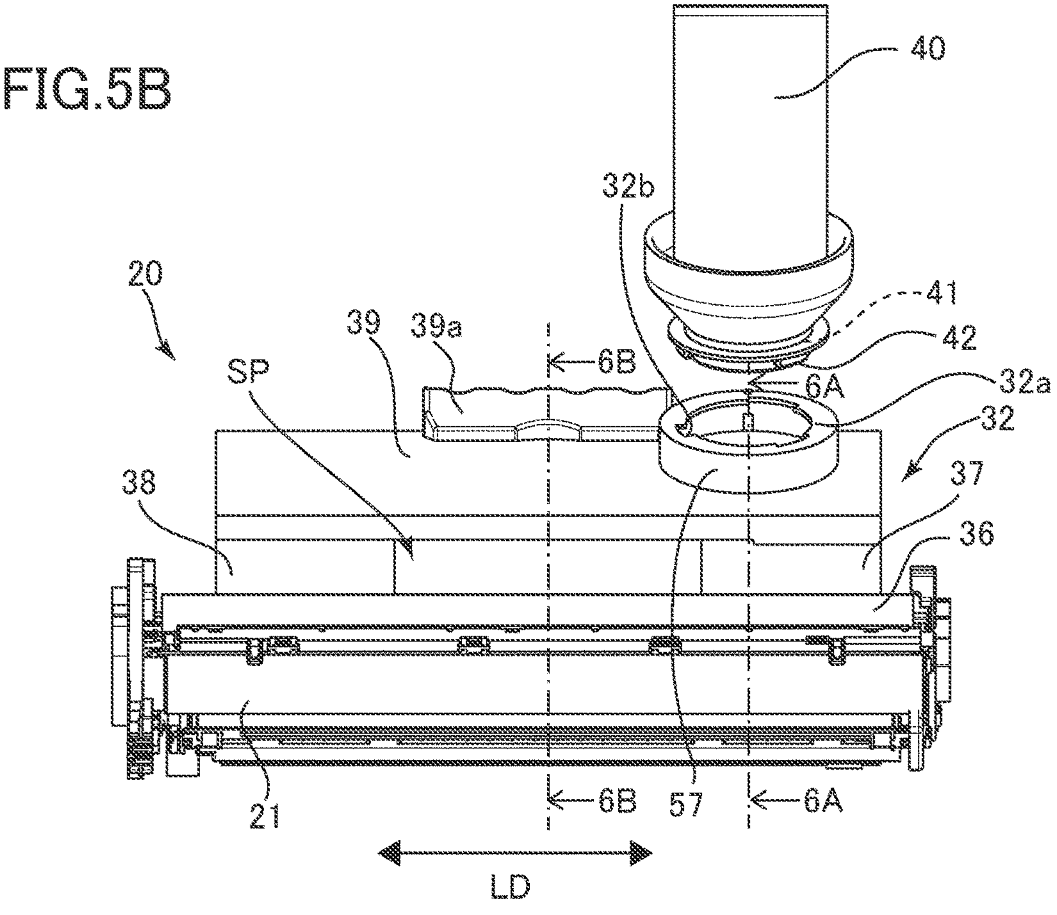
FIG. 5B is a front view of the developer container and the toner pack.

Next, a configuration of the developer container 32 and the toner pack 40 serving as a replenishing container will be described. FIG. 5A is a perspective view of the developer container 32 and the toner pack 40, and FIG. 5B is a front view of the developer container 32 and the toner pack 40. FIG. 6A is a cross-sectional view taken at line 6A-6A of FIG. 5B, and FIG. 6B is a cross-sectional view taken at line 6B-6B of FIG. 5B.

As illustrated in FIGS. 5A through 6B, the developer container 32 includes a conveyance chamber 36 storing the agitation member 34, and the conveyance chamber 36 serving as a storage portion for storing toner is extended along an entire length in a longitudinal direction LD (right and left directions) of the developer container 32. Further, the conveyance chamber 36 is formed integrally with a frame that rotatably supports the developing roller 31 and the feed roller 33, and stores toner, i.e., developer, to be borne on the developing roller 31. Further, the developer container 32 includes a first projected portion 37 that protrudes upward from a first end portion in the longitudinal direction of the conveyance chamber 36 and that serves as a projected portion communicated with the conveyance chamber 36, and a second projected portion 38 that protrudes upward from a second end portion in the longitudinal direction of the conveyance chamber 36. That is, the first projected portion 37 is provided on the first end portion of the developer container 32 in the rotational axis direction, i.e., longitudinal direction LD, of the developing roller 31, and protrudes toward the sheet discharge tray 81 in an intersecting direction intersecting the rotational axis relative to the center portion of the developer container 32.

The second projected portion 38 is provided at a second end portion of the developer container 32 in the rotational axis direction of the developing roller 31 and protrudes toward the sheet discharge tray 81 in the intersecting direction relative to the center portion of the developer container 32. In the present embodiment, the first projected portion 37 is formed on a left side of the developer container 32, and the second projected portion 38 is formed on a right side of the developer container 32. An attachment portion 57 to which the toner pack 40 is attached is provided on an upper end portion, i.e., leading edge portion, of the first projected portion 37, and the replenishing port 32*a* used to replenish the developer from the toner pack 40 to the conveyance chamber 36 is formed on the attachment portion 57. The toner pack 40 can be attached to the attachment portion 57 in a state where the toner pack 40 is exposed to the exterior of the apparatus.

The first projected portion 37 and the second projected portion 38 extend obliquely frontward in the apparatus and upward from the conveyance chamber 36. That is, the first projected portion 37 and the second projected portion 38 protrude upward toward a downstream direction in a discharge direction of the sheet discharge roller pair 80. Therefore, the replenishing port 32*a* formed in the first projected portion 37 is arranged frontward of the image forming apparatus 1, enabling easy toner replenishment operation to the developer container 32.

Especially according to the present embodiment, the reading unit 200 capable of opening and closing about a depth side of the apparatus is arranged above the opening/closing member 83, so that the replenishing port 32*a* should be arranged on the front side of the apparatus to allow efficient use of space between the replenishing port 32*a* and the reading unit 200. Therefore, workability for replenishing toner from the replenishing port 32*a* can be improved.

An upper portion of the first projected portion 37 and an upper portion of the second projected portion 38 are connected by a handle portion 39 serving as a connecting portion. A laser passage space SP serving as a space through which laser L (refer to FIG. 1A) irradiated from the scanner unit 11 (refer to FIG. 1A) toward the photosensitive drum 21 is capable of passing is formed between the handle portion 39 and the conveyance chamber 36.

The handle portion 39 includes a grip portion 39*a* that allows the user to hook his/her fingers to grip the handle portion 39, and the grip portion 39*a* is formed to protrude upward from a top panel of the handle portion 39. The first projected portion 37 has a hollow interior and the replenishing port 32*a* is formed on the upper face. The replenishing port 32*a* is configured to allow the toner pack 40 to be connected thereto.

By providing the first projected portion 37 having the replenishing port 32*a* formed on a tip portion thereof arranged on one side in the longitudinal direction of the developer container 32, the laser passage space SP through which the laser L emitted from the scanner unit 11 can pass is secured, and the image forming apparatus 1 can be downsized. Further, since the second projected portion 38 is provided on the other side in the longitudinal direction of the developer container 32 and the handle portion 39 connecting the first projected portion 37 and the second projected portion 38 is provided, the usability during removal of the process unit 20 from the printer body 100 is improved. The second projected portion 38 can be formed in a hollow shape similarly as the first projected portion 37 or can be formed as a solid body.

The toner pack 40 is configured to be detachably attached to the attachment portion 57 of the first projected portion 37, as illustrated in FIGS. 5A through 6B. Further, the toner pack 40 includes a shutter member 41 provided on the opening portion and capable of being opened and closed, and a plurality of (according to the present embodiment, three) projections 42 formed to correspond to a plurality of (according to the present embodiment, three) groove portions 32*b* formed on the attachment portion 57. When replenishing toner to the developer container 32, the user positions the projections 42 of the toner pack 40 so that they pass through the groove portions 32*b* of the attachment portion 57 to thereby connect the toner pack 40 to the attachment portion 57. By rotating the toner pack 40 for 180 degrees in this state, the shutter member 41 of the toner pack 40 abuts against an abutment portion (not shown) of the attachment portion 57 and rotates with respect to the body of the toner pack 40, and the shutter member 41 is thereby opened. Thereby, toner stored in the toner pack 40 leaks from the toner pack 40 and the leaked toner passes through the replenishing port 32*a* to enter the hollow first projected portion 37. The shutter member 41 may be provided on the replenishing port 32*a* side.

The first projected portion 37 has an inclined plane 37*a* provided at a position opposed to an opening of the replenishing port 32*a*, and the inclined plane 37*a* is inclined downward toward the conveyance chamber 36. Therefore, toner replenished through the replenishing port 32*a* is guided along the inclined plane 37*a* to the conveyance chamber 36. Further, the agitation member 34 includes, as illustrated in FIGS. 6A and 6B, an agitation shaft 34*a* extending in the longitudinal direction, and a blade portion 34*b* extending outward in a radial direction from the agitation shaft 34*a*. The blade portion 34*b* is a sheet having flexibility.

Toner replenished through the replenishing port 32*a* arranged upstream in the conveyance direction of the agitation member 34 is conveyed toward the developing roller 31 and the feed roller 33 by the rotation of the agitation member 34. The conveyance direction of the agitation member 34 is a direction parallel to a longitudinal direction LD (refer to FIG. 5B) of the developer container 32. The replenishing port 32*a* and the first projected portion 37 are arranged at a first end portion in the longitudinal direction of the developer container 32, and through repeated rotation of the agitation member 34, toner spreads across the entire length of the developer container 32. In the present embodiment, the agitation member 34 is composed of the agitation shaft 34*a* and the blade portion 34*b*, but a helical agitation shaft can also be adopted as a configuration for spreading toner across the entire length of the developer container 32.

Figure 7:
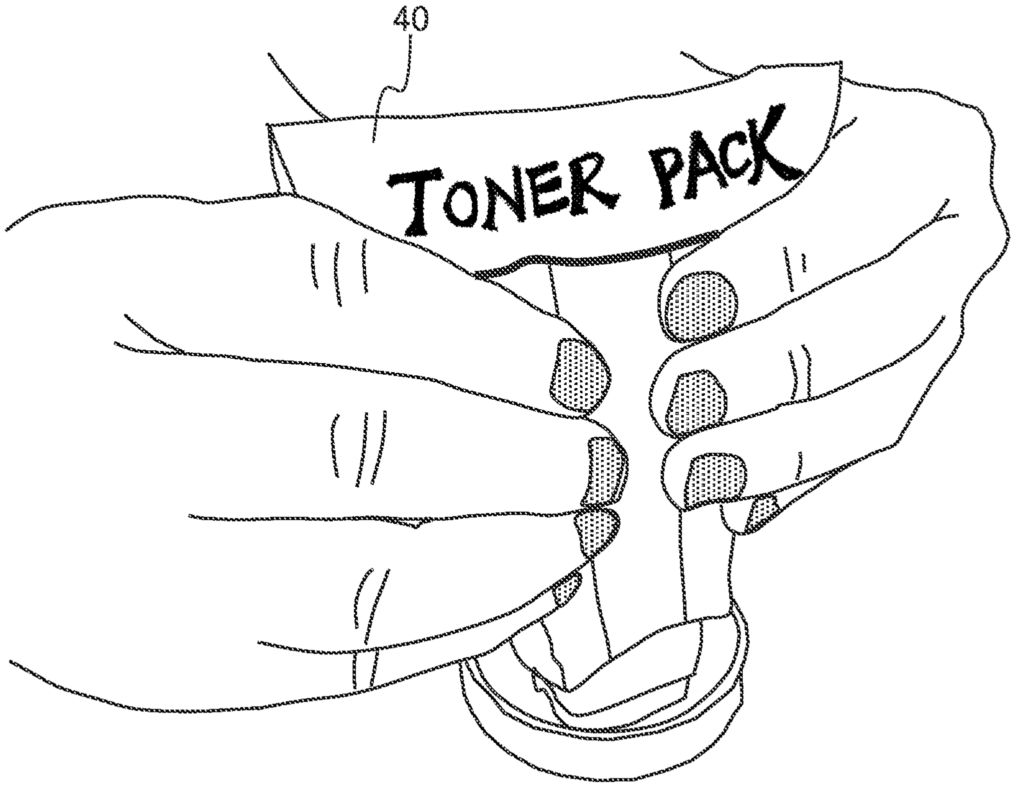
FIG. 7 is a perspective view of the toner pack.
Figure 8A:
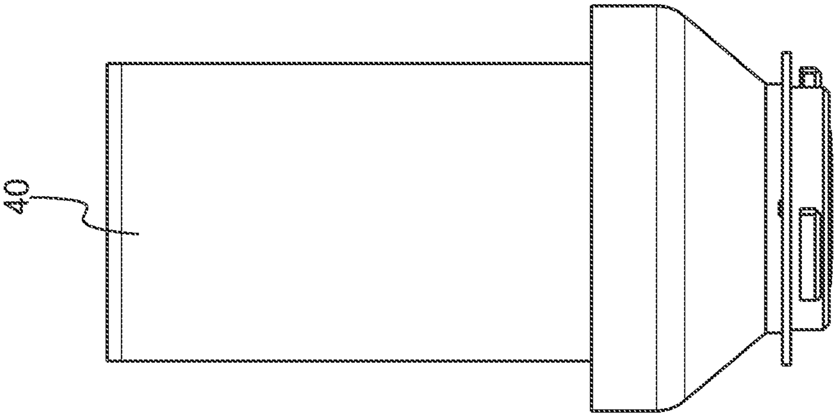
FIG. 8A is a front view of the toner pack.
Figure 8B:
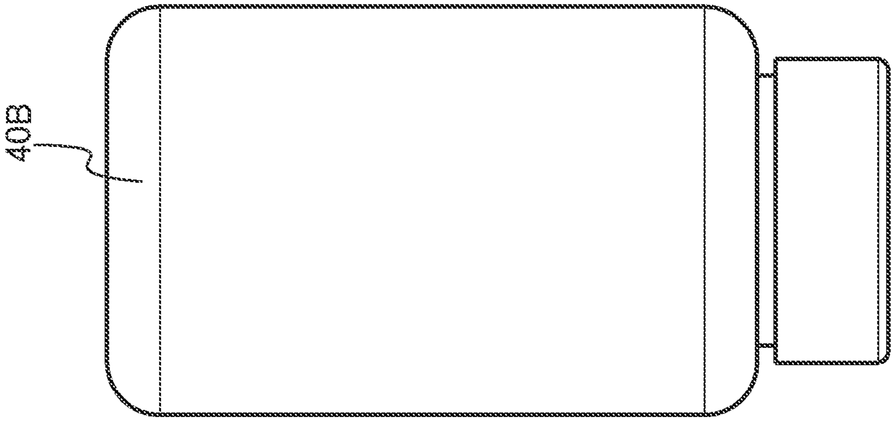
FIG. 8B is a front view of a first modified example of the toner pack.
Figure 8C:
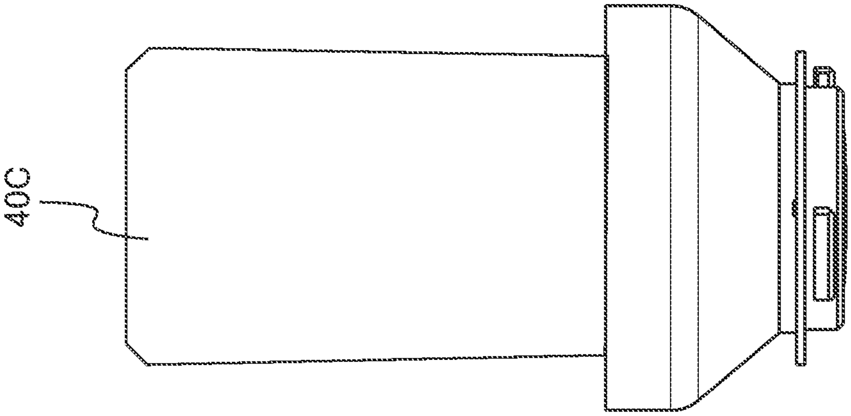
FIG. 8C is a front view of a second modified example of the toner pack.

According to the present embodiment, the toner pack 40 is formed of an easily deformable plastic bag, as illustrated in FIGS. 7 and 8A, but the toner pack configuration is not limited thereto. For example, the toner pack can be formed of an approximately conical bottle container 40B as illustrated in FIG. 8B or can be formed of a paper package 40C as illustrated in FIG. 8C. In any case, the toner pack can be formed of any material and can have any shape. A preferable method for discharging toner from the toner pack is to have the user squeeze the pack in the case of the toner pack 40 or the paper package 40C, or to have the user flick the container to vibrate the container and discharge toner in the case of the bottle container 40B. Further, a discharge mechanism can be provided in the bottle container 40B to discharge toner from the bottle container 40B. Even further, the discharge mechanism can be engaged with the printer body 100 to receive driving force from the printer body 100.

In any of the toner packs, the shutter member 41 can be omitted, or a slide-type shutter member can be adopted instead of the rotation-type shutter member 41. The shutter member 41 can also adopt a configuration where the toner pack is broken by attaching the toner pack to the replenishing port 32*a* or by rotating the toner pack in the attached state, or the shutter member 41 can adopt a detachable lid structure such as a seal.

Method for Detecting Residual Amount of Toner

Figure 9A:
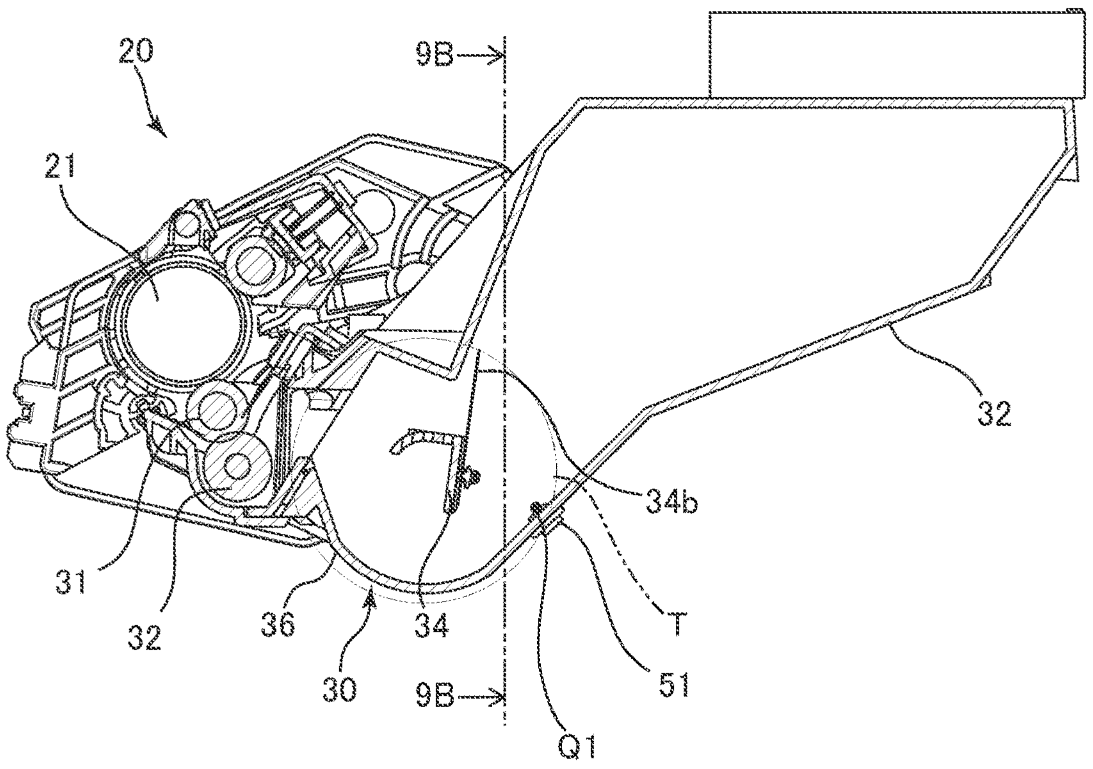
FIG. 9A is a cross-sectional view of a toner residual amount sensor.
Figure 9B:
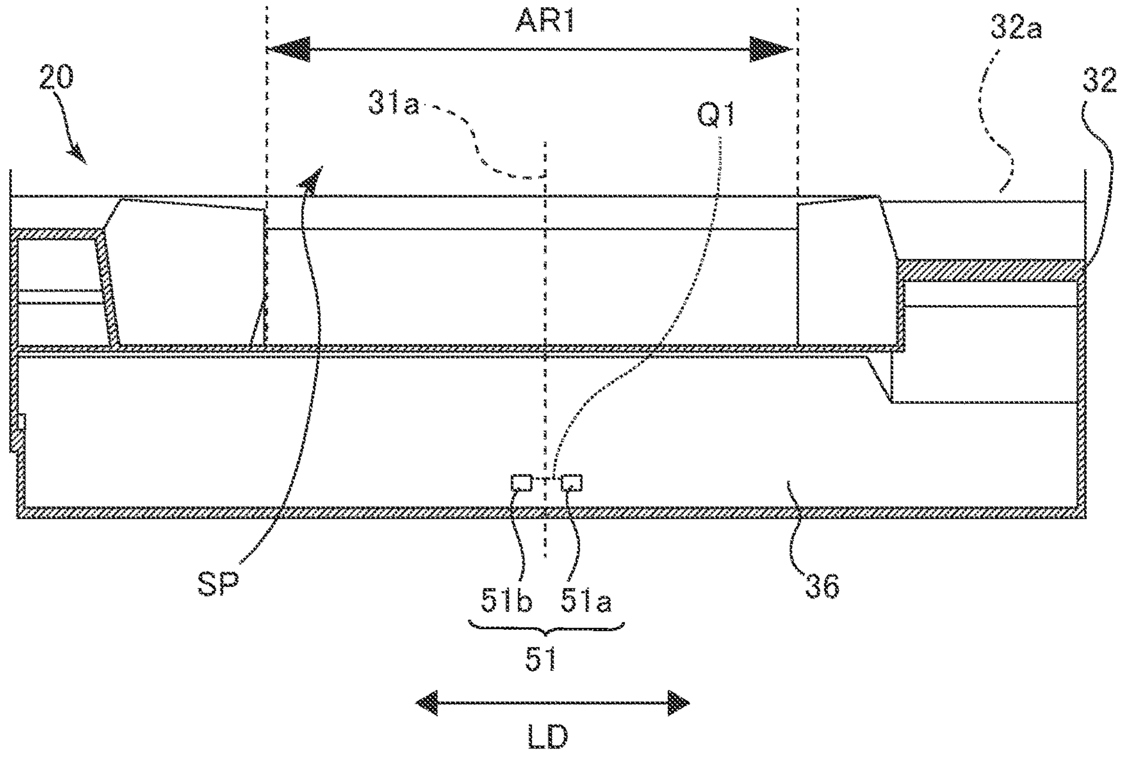
FIG. 9B is a cross-sectional view taken at line 9B-9B of FIG. 9A.

Next, the method for detecting a residual amount of toner in the developer container 32 will be described with reference to FIGS. 9A through 11B. FIG. 9A is a cross-sectional view of a toner residual amount sensor 51, and FIG. 9B is a cross-sectional schematic view of a 9B-9B cross section of FIG. 9A viewed from the developing roller 31 side toward the developer container 32. Further, FIG. 10 is a circuit diagram illustrating one example of a circuit configuration of the toner residual amount sensor 51.

The toner residual amount sensor 51 for detecting residual amount information corresponding to the residual amount of toner in the conveyance chamber 36 is provided in the developer container 32 according to the present embodiment, as illustrated in FIGS. 9A and 9B. The toner residual amount sensor 51 is arranged on a side face of the developer container 32 that is opposite from the developing roller 31, that is, on a side surface 36*a*, and includes a light emitting portion 51*a* and a light receiving portion 51*b*. The light emitting portion 51*a* and the light receiving portion 51*b* are arranged in an aligned manner along the longitudinal direction LD of the process unit 20. The light emitted from the light emitting portion 51*a* passes through the interior of the conveyance chamber 36 and is received by the light receiving portion 51*b*. That is, the light emitting portion 51*a* and the light receiving portion 51*b* form an optical path Q1 in the interior of the conveyance chamber 36. The optical path Q1 extends in the longitudinal direction LD. The light emitting portion 51*a* and the light receiving portion 51*b* can have their light emitting element and photodetecting element arranged on an interior of the conveyance chamber 36, or they can have their light emitting element and photodetecting element arranged on an exterior of the conveyance chamber 36 with a light guide guiding the light into and out of the conveyance chamber 36.

Further, the light emitting portion 51*a* and the light receiving portion 51*b* are arranged at a center part of the conveyance chamber 36 in the longitudinal direction LD. More specifically, the light emitting portion 51*a* and the light receiving portion 51*b* are arranged within an area AR1 corresponding to the laser passage space SP in the longitudinal direction LD. The light emitting portion 51*a* is arranged between the replenishing port 32*a* and a center 31*a* of the developing roller 31 in the longitudinal direction LD. A broken line in FIG. 9B illustrates a position corresponding to the center 31*a* of the developing roller 31. The center 31*a* of the developing roller 31 is arranged between the light emitting portion 51*a* and the light receiving portion 51*b* in the longitudinal direction LD. The light emitting portion 51*a* and the light receiving portion 51*b* are arranged at the center part of the conveyance chamber 36, so that the residual amount of toner of the conveyance chamber 36 can be detected favorably. In other words, developer, i.e., toner, may be distributed unevenly at the end portions in the longitudinal direction LD in the conveyance chamber 36, but since uneven distribution of developer does not often occur at the center part of the conveyance chamber 36, the actual residual amount of toner can be detected.

Figure 10:
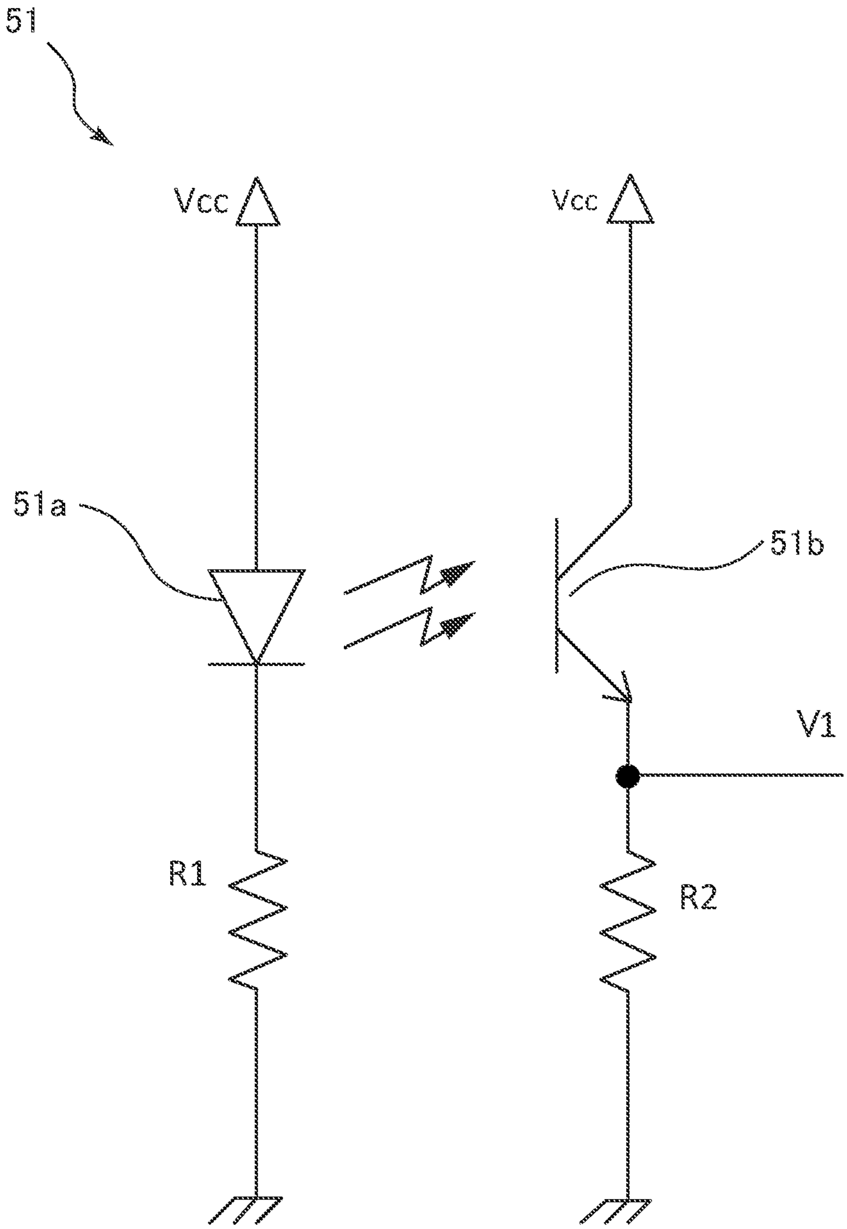
FIG. 10 is a circuit diagram of the toner residual amount sensor.

FIG. 10 illustrates a case where an LED is used as the light emitting portion 51*a* and a phototransistor that is turned on by receiving light from the LED is used as the light receiving portion 51*b*, but the present invention is not limited thereto. For example, a halogen lamp or a fluorescent lamp can be adopted in the light emitting portion 51*a*, and a photodiode or an avalanche photodiode can be adopted in the light receiving portion 51*b*. A switch (not shown) is provided between the light emitting portion 51*a* and a power supply voltage Vcc, and by turning the switch on, a voltage from the power supply voltage Vcc is applied to the light emitting portion 51*a*, and the light emitting portion 51*a* will be in a conduction state. Meanwhile, a switch (not shown)

is also provided between the light receiving portion 51*b* and the power supply voltage Vcc, and by turning the switch on, the light receiving portion 51*b* will be in a conduction state by current corresponding to the detected light amount.

The power supply voltage Vcc and a current limiting resistor R1 are connected to the light emitting portion 51*a*, and the light emitting portion 51*a* emits light based on a current determined by the current limiting resistor R1. The light emitted from the light emitting portion 51*a* passes through the optical path Q1 as illustrated in FIG. 9B and is received by the light receiving portion 51*b*. The power supply voltage Vcc is connected to a corrector terminal of the light receiving portion 51*b*, and a detecting resistor R2 is connected to an emitter terminal. The light receiving portion 51*b* serving as a phototransistor receives the light emitted from the light emitting portion 51*a* and outputs a signal, i.e., current, corresponding to the received light amount. The signal is converted into a voltage V1 by the detecting resistor R2 and entered to an A/D conversion unit 95 of a control unit 90 (refer to FIG. 12). In other words, the light receiving portion 51*b* varies an output value in accordance with an amount of toner, i.e., developer, stored in the conveyance chamber 36.

The control unit 90, i.e., CPU 91, determines whether light from the light emitting portion 51*a* has been received by the light receiving portion 51*b* based on an entered voltage level. The control unit 90, i.e., CPU 91, computes an amount of toner, i.e., amount of developer, within the developer container 32 based on a length of time during which the light receiving portion 51*b* detects light and the received light intensity in a state where toner within the developer container 32 has been agitated by the agitation member 34 for a predetermined period of time. That is, a ROM 93 stores in advance a table for outputting the residual amount of toner based on the light reception time and the light intensity while conveying toner by the agitation member 34, and the control unit 90 predicts/computes the residual amount of toner based on the input to the A/D conversion unit 95 and the table.

More specifically, as illustrated in FIG. 9A, the optical path Q1 of the toner residual amount sensor 51 is set to overlap with a rotation trajectory T of the agitation member 34 when viewed in the axial direction of the rotation shaft of the agitation member 34. In other words, the light emitted from the light emitting portion 51*a* of the toner residual amount sensor 51 passes through the interior of the conveyance chamber 36 within the rotation trajectory of the agitation member 34 when viewed in the axial direction of the agitation member 34. The time during which the optical path Q1 has been blocked by toner conveyed by the agitation member 34 while the agitation member 34 rotates once, that is, the time during which the light receiving portion 51*b* lacks to detect light from the light emitting portion 51*a*, varies depending on the residual amount of toner. Further, the light intensity of light received by the light receiving portion 51*b* also varies depending on the residual amount of toner.

That is, when the residual amount of toner is large, the optical path Q1 tends to be blocked by toner, so that the time during which the light receiving portion 51*b* receives light becomes short and the light intensity of the light received by the light receiving portion 51*b* becomes weak. In contrast, when the residual amount of toner is small, the time during which the light receiving portion 51*b* receives light becomes long and the light intensity of the light received by the light receiving portion 51*b* becomes strong. Accordingly, the control unit 90 can determine the level of the residual amount of toner as follows based on the light reception time and the received light intensity of the light receiving portion 51*b*.

Figure 11A:
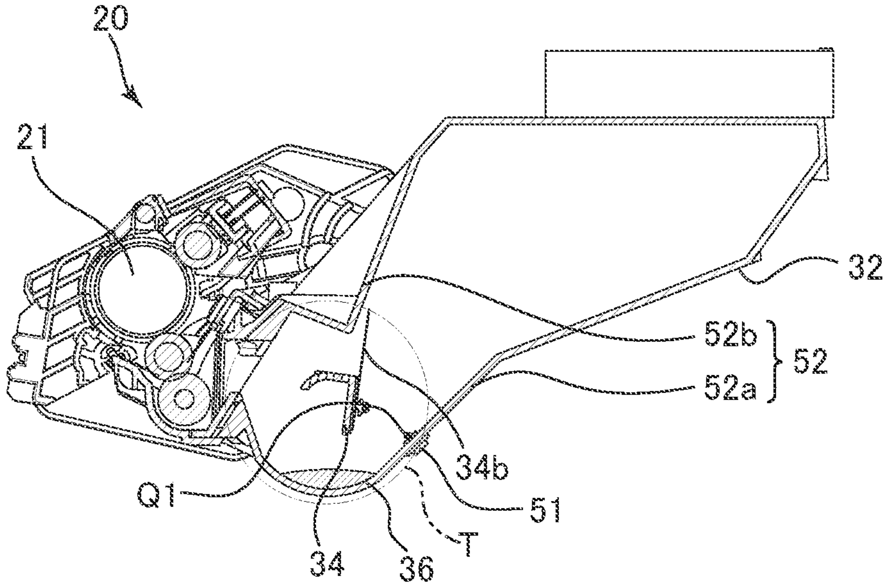
FIG. 11A is a cross-sectional view of the developer container in a state where the residual amount of toner is small.
Figure 11B:
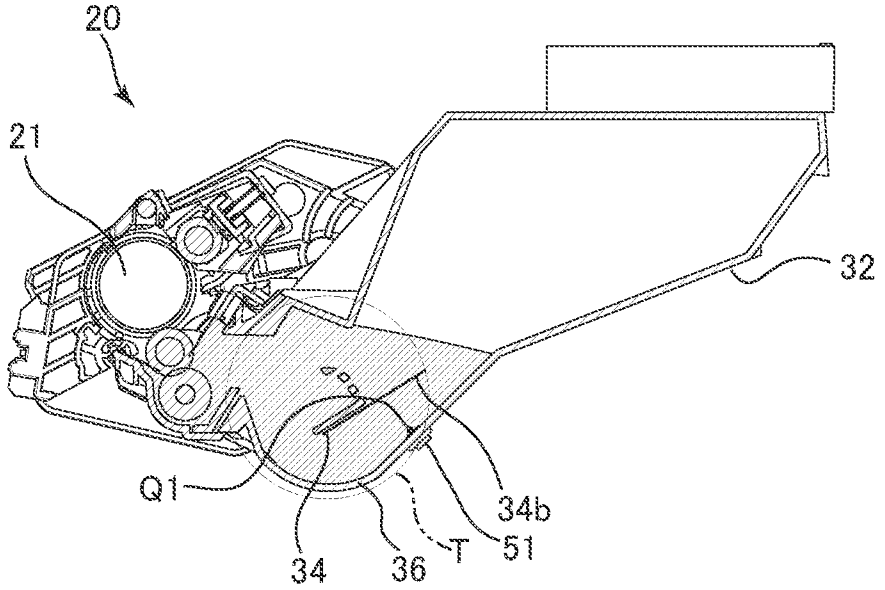
FIG. 11B is a cross-sectional view of the developer container in a state where the residual amount of toner is large.

For example, as illustrated in FIG. 11A, if there is only a very small amount of toner in the conveyance chamber 36 of the developer container 32, the time during which the light receiving portion 51*b* receives light becomes long and the light intensity of light received by the light receiving portion 51*b* becomes strong, so that it is determined that there is only a small amount of residual toner. Meanwhile, as illustrated in FIG. 11B, if the amount of toner in the conveyance chamber 36 of the developer container 32 is large, the timer during which the light receiving portion 51*b* receives light becomes short and the light intensity of light received by the light receiving portion 51*b* becomes weak, so that it is determined that there is a large amount of residual toner.

The method for detecting/estimating the residual amount of toner is not limited to the method for detecting the residual amount of toner using light as described with reference to FIG. 9, and various types of known methods for detecting/estimating the residual amount of toner can be adopted. For example, two or more metal plates or conductive resin sheets extending in the longitudinal direction of the developing roller are arranged on an inner wall of the developer container 32 serving as a frame, and electrostatic capacity between the two metal plates or two conductive resin sheets is measured to detect/estimate the residual amount of toner. Alternatively, a load cell can be arranged in a manner supporting the developing apparatus 30 from below, and the CPU 91 subtracts a weight of the developing apparatus 30 when the toner is empty from a weight measured by the load cell to compute the residual amount of toner.

Control System of Image Forming Apparatus

Figure 12:
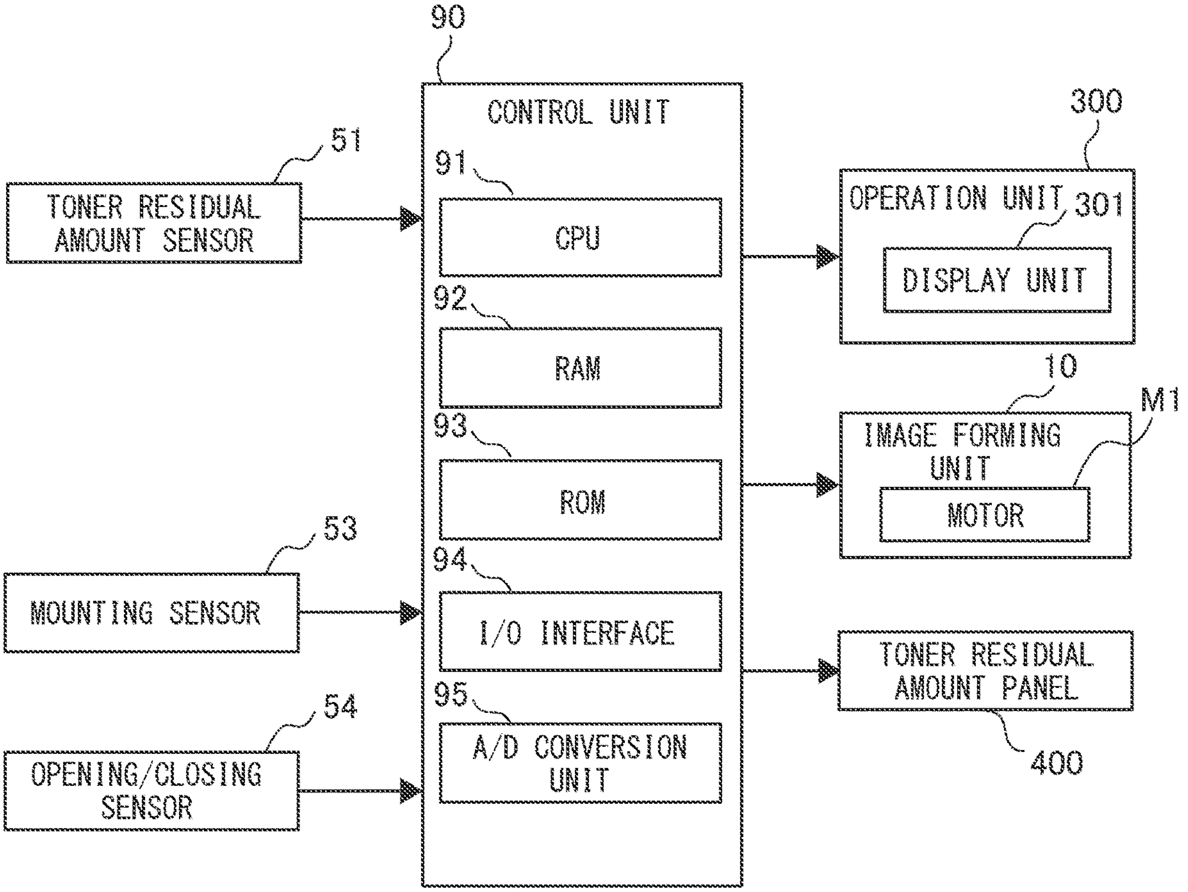
FIG. 12 is a block diagram illustrating a control system of the image forming apparatus.

FIG. 12 is a block diagram illustrating a control system of the image forming apparatus 1. The control unit 90 serving as a controller of the image forming apparatus 1 includes a CPU 91 serving as an arithmetic unit, a RAM 92 used as a work area of the CPU 91, and a ROM 93 storing various programs. Further, the control unit 90 includes an I/O interface 94 serving as an input/output port that is connected to an external apparatus, and an A/D conversion unit 95 that converts analog signals into digital signals.

The toner residual amount sensor 51, a mounting sensor 53 and an opening/closing sensor 54 are connected to an input side of the control unit 90, and the mounting sensor 53 detects that the toner pack 40 has been mounted to the replenishing port 32*a* of the developer container 32. For example, the mounting sensor 53 is composed of a pressure sensitive switch provided on the replenishing port 32*a* that outputs a detection signal when pressed by the projection 42 of the toner pack 40. Further, the opening/closing sensor 54 detects whether the opening/closing member 83 has been opened with respect to the top cover 82. The opening/closing sensor 54 is composed of a pressure sensitive switch or a magnetic sensor.

Further, the operation unit 300, the image forming unit 10, and a toner residual amount panel 400 serving as a notification unit for notifying information related to the residual amount of toner are connected to the control unit 90, and the operation unit 300 includes a display unit 301 capable of displaying various setting screens and physical keys. The display unit 301 is composed, for example, of a liquid crystal panel. The image forming unit 10 includes the motor M1 serving as a driving source for driving the photosensitive drum 21, the developing roller 31, the feed roller 33, and the agitation member 34. Further, it is possible to configure the photosensitive drum 21, the developing roller 31 and the feed roller 33, and the agitation member 34 to be driven by different motors.

The toner residual amount panel 400 is provided on a front right side of the casing of the printer body 100, that is, on an opposite side from the operation unit 300 arranged on the left side, as illustrated In FIG. 1B and FIGS. 13A through 13D and displays information regarding the residual amount of toner inside the developer container 32. According to the present embodiment, the toner residual amount panel 400 is a panel member composed of a plurality of (three, according to the present embodiment) scales arranged in an aligned manner in the vertical direction, and the scales correspond to a low level, a middle (mid) level, and a full level.

Figure 13A:
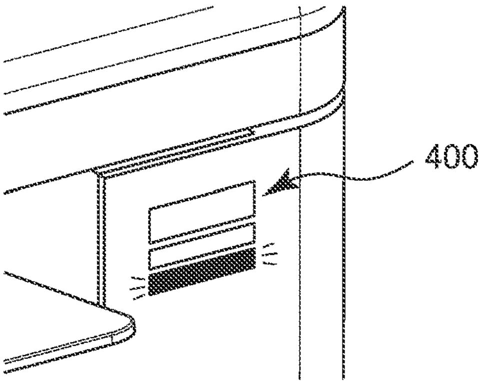
FIG. 13A is a perspective view of a state where a toner residual amount panel 400 indicates a nearly empty level.
Figure 13B:
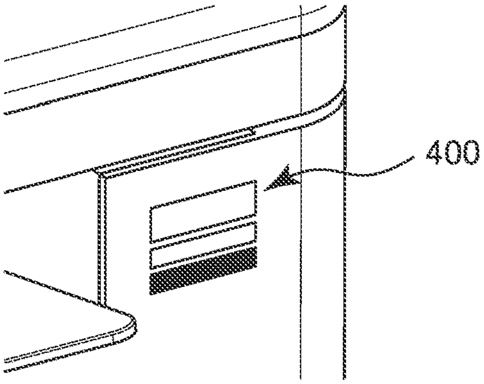
FIG. 13B is a perspective view of a state where the toner residual amount panel 400 indicates a low level.
Figure 13C:
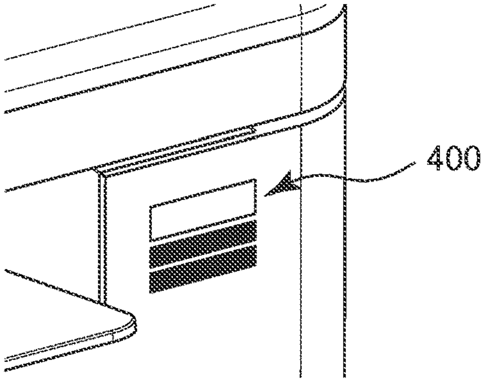
FIG. 13C is a perspective view of a state where the toner residual amount panel 400 indicates a mid level.
Figure 13D:
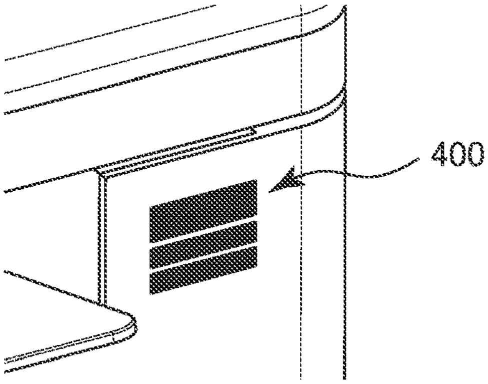
FIG. 13D is a perspective view of a state where the toner residual amount panel 400 indicates a full level.

As illustrated in FIG. 13A, a state where only the lower scale is blinking indicates that the residual amount of toner in the developer container 32 is at a nearly empty level. As illustrated in FIG. 13B, a state where only the lower scale is lit indicates that the residual amount of toner in the developer container 32 is at a low level. As illustrated in FIG. 13C, a state where the lower and middle scales are lit and the upper scale is not lit indicates that the residual amount of toner in the developer container 32 is at a middle level. As illustrated in FIG. 13D, a state where all the three scales are lit indicates that the residual amount of toner in the developer container 32 is at a full level.

The nearly empty level indicates that the residual amount of toner in the developer container 32 will soon run out and image formation cannot be performed properly. The low level indicates that the residual amount of toner is greater than the nearly empty level and smaller than the middle level. The middle level indicates that the residual amount of toner is greater than the low level and smaller than the full level.

Instead of being composed of a liquid crystal panel, the toner residual amount panel 400 can be composed of a light source such as an LED or an incandescent lamp and a diffusion lens. Alternatively, a configuration can be adopted where the residual amount of toner is displayed by scales as described according to the present embodiment on a display of the operation unit 300, without providing the toner residual amount panel 400. Further, a replenishment notification for prompting toner replenishment on the operation unit 300 can be displayed when the residual amount of toner in the developer container 32 is at a low level. Moreover, if toner has run out, a replenishment notification for prompting toner replenishment on the operation unit 300 can be displayed.

According further to the present embodiment, a configuration has been described where four states are displayed using three scales, but the number of scales is not limited thereto, and the number can be set arbitrarily according to the configuration of the image forming apparatus. Further, a configuration can also be adopted where the residual amount of toner is displayed successively by a percentage indication or a gauge display. Further, the notification of the residual amount of toner to the user can be performed by audio through a speaker.

Further, in the example illustrated in FIGS. 13A through 13D, the toner residual amount panel 400 is illustrated as a notification unit displaying the residual amount of toner, but the present invention is not limited thereto. For example, the display of FIG. 13B can be a display indicating that toner replenishment is required, the display of FIG. 13C can be a display indicating that toner replenishment is not required, and the display of FIG. 13D can be a display indicating that sufficient toner replenishment has been performed.

As described, according to the present embodiment, the light emitting portion 51*a* and the light receiving portion 51*b* of the toner residual amount sensor 51 are provided on the process unit 20 that includes the conveyance chamber 36 for storing toner. Therefore, the relative position of the optical path Q1 in the conveyance chamber 36 is fixed, so that the residual amount of toner can be detected stably regardless of the positional accuracy of the process unit 20 on the printer body 100.

Further, since the relative position of the optical path Q1 in the conveyance chamber 36 is fixed, there is no need to take into consideration the misregistration of the conveyance chamber 36 and the optical path Q1 in advance when designing the toner residual amount sensor 51 and the developer container 32. Thus, there is no need to select an optical element with a margin in the light amount of the toner residual amount sensor 51, and the freedom of design of the toner residual amount sensor 51 and the developer container 32 can be improved and costs can be cut down.

Further, the light emitting portion 51*a* and the light receiving portion 51*b* according to the present embodiment are arranged in an aligned manner along the longitudinal direction LD of the process unit 20, and are arranged on a same side, i.e., front side, with respect to the conveyance chamber 36 when viewed in the longitudinal direction LD. Therefore, the light emitting portion 51*a* and the light receiving portion 51*b* can be arranged in a compact manner and the power supply configuration for supplying power to the light emitting portion 51*a* and the light receiving portion 51*b* can also be arranged in a small space. Therefore, the process unit 20 can be downsized.

The present embodiment adopts a system, i.e., direct replenishment system, where toner is replenished directly from the toner pack 40 to the developer container 32 through the replenishing port 32*a*, so that there is no need to remove the process unit 20 when replenishing toner to the developer container 32. Further, since the replenishing port 32*a* of the developer container 32 is formed on the upper plane of the first projected portion 37 that is protruded upward from the first end portion in the longitudinal direction of the conveyance chamber 36, it is arranged close to the second opening portion 82*a*. Therefore, the user can perform the toner replenishment operation to the developer container 32 easily through the replenishing port 32*a*. Further, there is no need to replace components such as the developing roller 31 or the feed roller 33 when replenishing toner to the developer container 32, so that costs can be cut down.

Further, since the laser passage space SP is formed in a manner surrounded by the first projected portion 37, the second projected portion 38, the handle portion 39, and the conveyance chamber 36, the developer container 32 and the scanner unit 11 can be arranged close to one another, and the image forming apparatus 1 can be downsized.

Further, since the agitation member 34 is driven when the toner pack 40 is mounted to the replenishing port 32*a* and toner replenishment operation is performed, a toner packing phenomenon can be reduced even if the replenishing port 32*a* is arranged on the first end side in the longitudinal direction of the developer container 32. Thereby, image defects can be reduced and detection accuracy of residual amount information of toner using the light emitting portion 51*a* and the light receiving portion 51*b* can be improved.

Second Embodiment

Next, a second embodiment of the present invention will be described. The configuration of the developing apparatus 30 of the first embodiment has been changed according to the second embodiment. Configurations similar to the first embodiment are either not shown or denoted with the same reference numbers and described.

Figure 14:
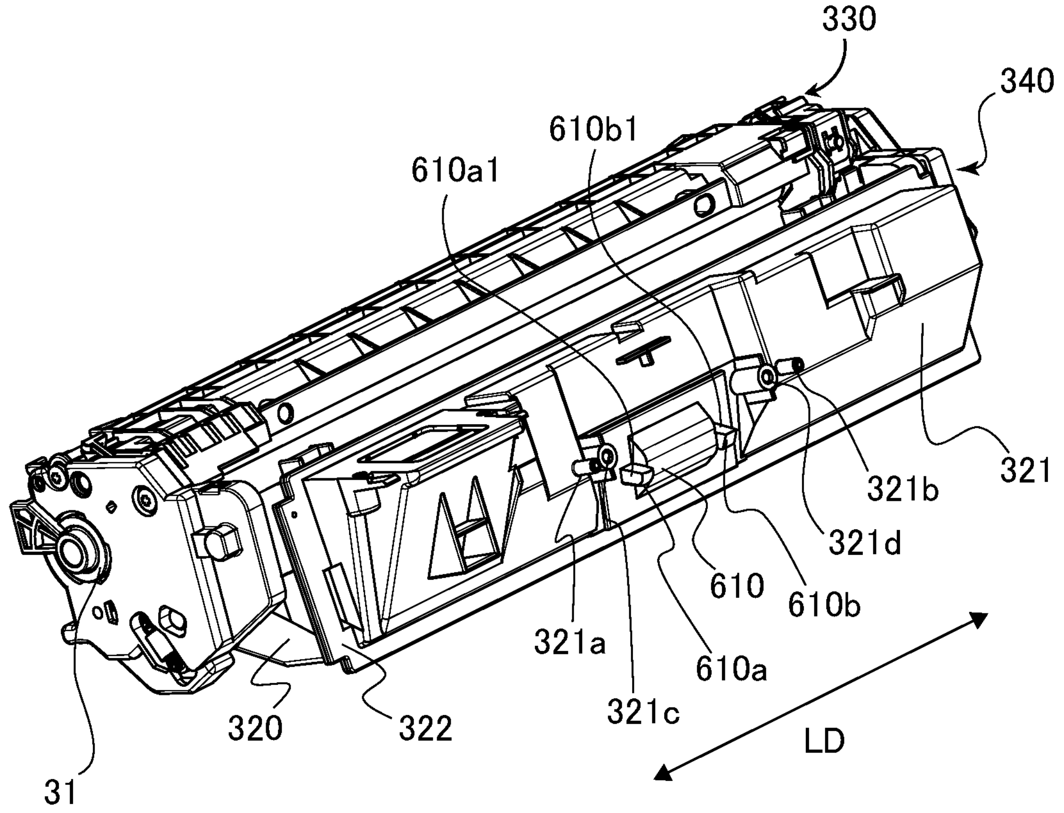
FIG. 14 is a perspective view of the developing apparatus.
Figure 15A:
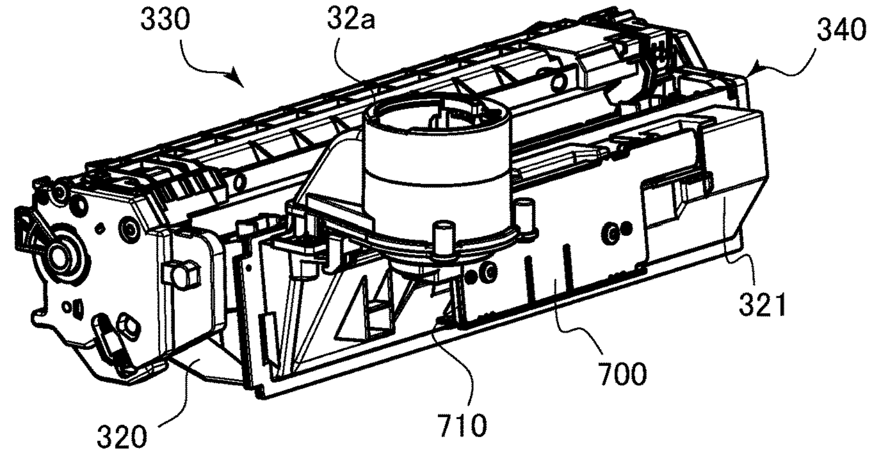
FIG. 15A is a perspective view of a state where a circuit board and a circuit board retaining member are assembled to a developer container lid.
Figure 15B:
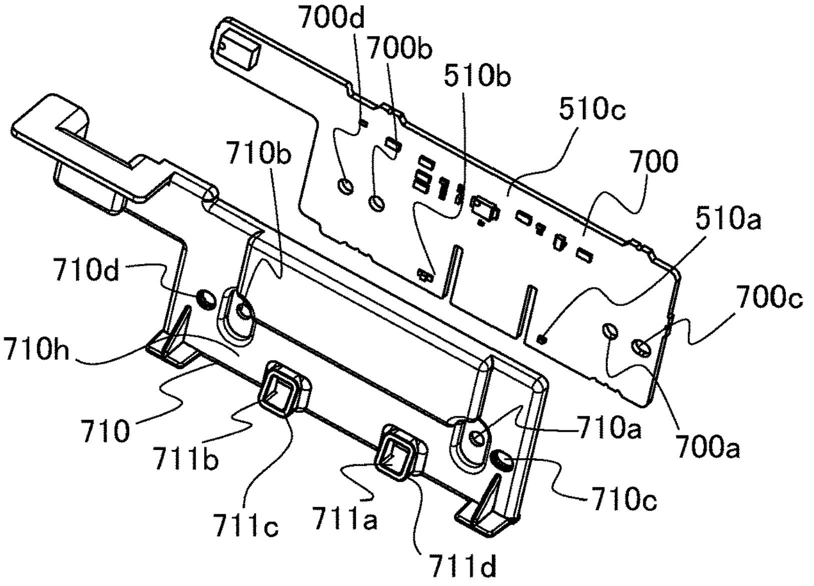
FIG. 15B is a perspective view of the circuit board and the circuit board retaining member.
Figure 15C:
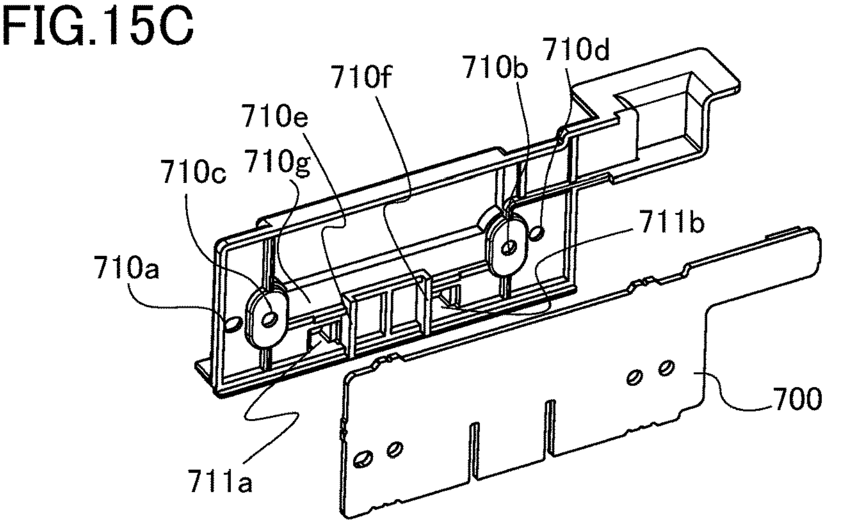
FIG. 15C is another perspective view of the circuit board and the circuit board retaining member.
Figure 16A:
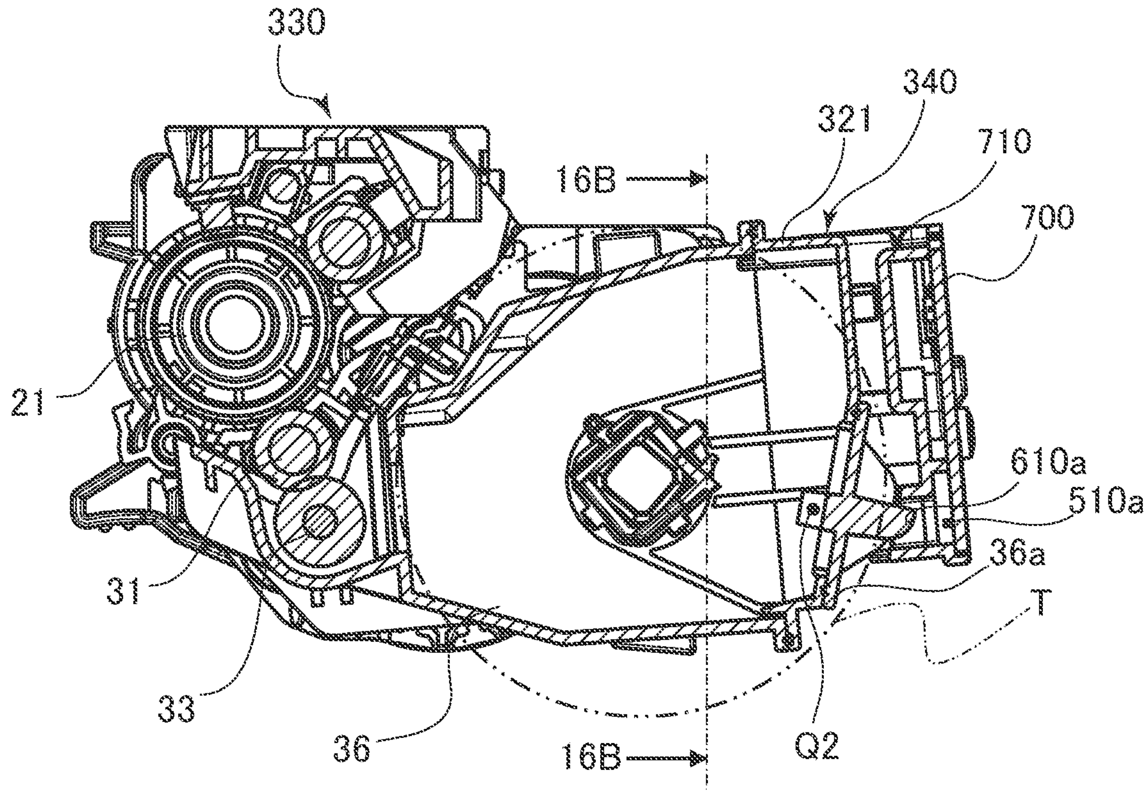
FIG. 16A is a cross-sectional view of the developing apparatus.
Figure 16B:
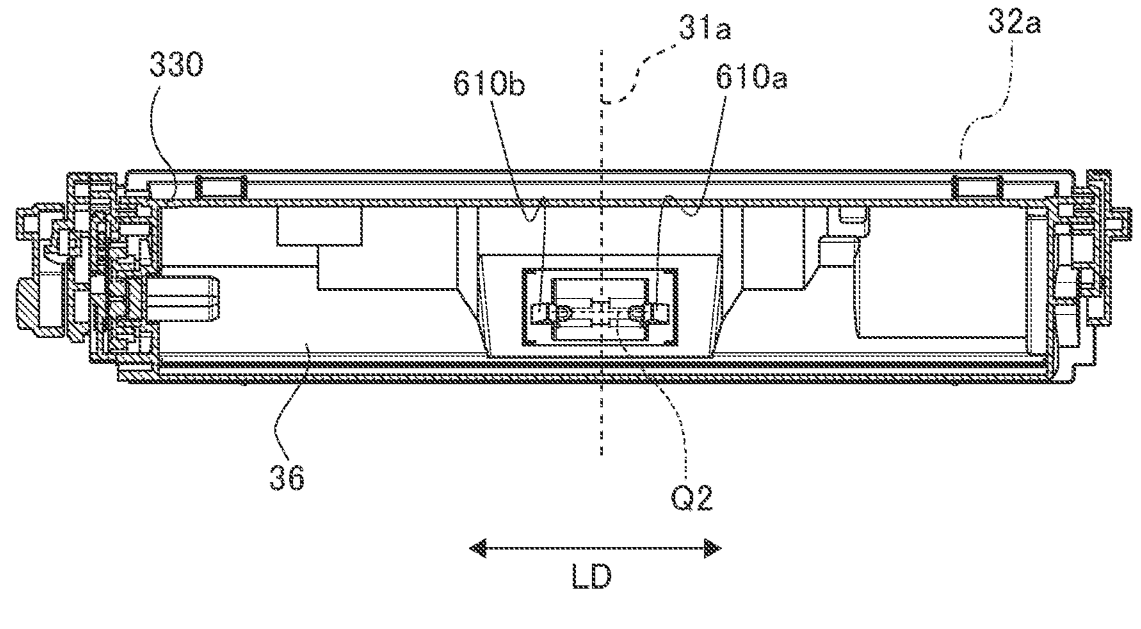
FIG. 16B is a cross-sectional view taken at line 16B-16B of FIG. 16A.
Figure 17A:
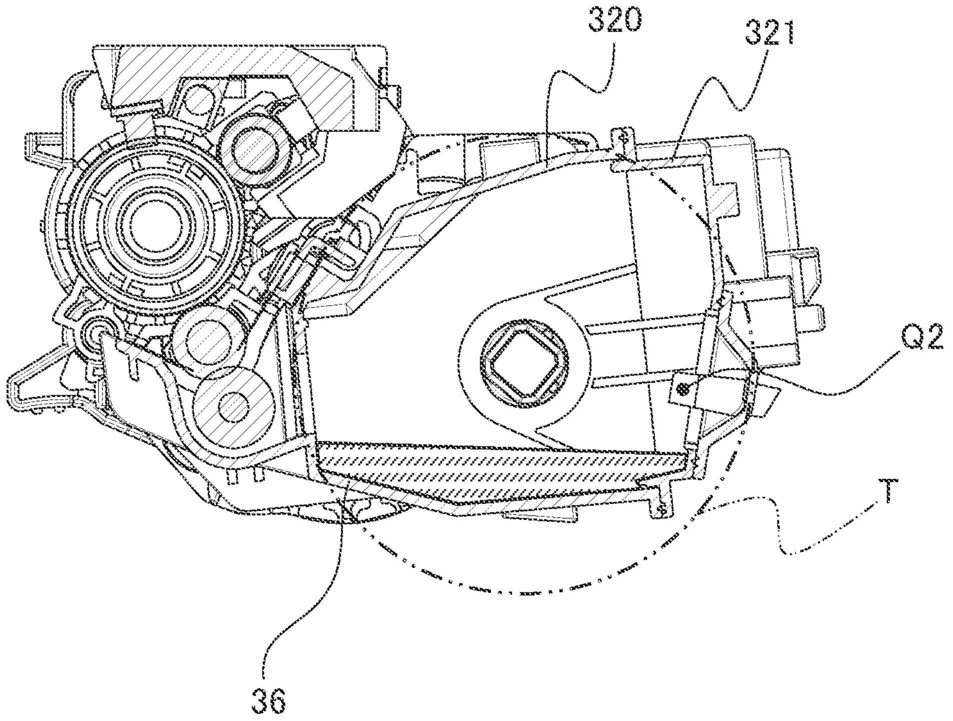
FIG. 17A is a cross-sectional view of a developer container in a state where the toner residual amount is small.
Figure 17B:
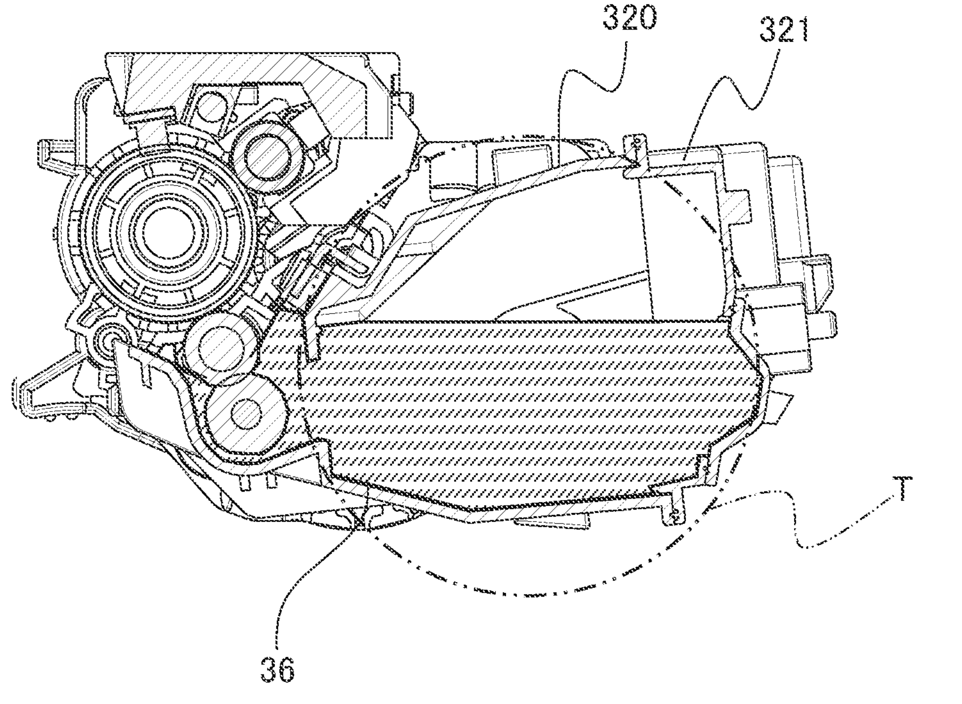
FIG. 17B is a cross-sectional view of a developer container in a state where the toner residual amount is large.

A developing apparatus 330 according to the present embodiment will be described with reference to FIGS. 14 through 17. The developing apparatus 330 constitutes a part of the process unit 20 (refer to FIG. 3). FIG. 14 is a perspective view illustrating the developing apparatus 330. FIG. 15A is a perspective view illustrating a state where a circuit board 700 and a circuit board retaining member 710 are assembled to a developer container lid 321. FIG. 15B is a perspective view illustrating the circuit board 700 and the circuit board retaining member 710, and FIG. 15C is another perspective view illustrating the circuit board 700 and the circuit board retaining member 710. FIG. 16A is a cross-sectional view that passes through a light emitting portion 510*a* of the developing apparatus 330, and FIG. 16B is a cross-sectional view taken at line 16B-16B of FIG. 16A. FIG. 17A is a cross-sectional view illustrating a developer container 320 in a state where the amount of residual toner is small, and FIG. 17B is a cross-sectional view illustrating the developer container 320 in a state where the amount of residual toner is great.

As illustrated in FIG. 14, the developing apparatus 330 includes the developer container 320 and the developer container lid 321, and the developer container 320 and the developer container lid 321 are connected by a connecting portion 322. The developer container 320, the developer container lid 321 and the connecting portion 322 constitute a frame 340 of the developing apparatus 330. The frame 340 is provided with the conveyance chamber 36 (refer to FIG. 16A) for storing developer including toner (hereinafter referred to as toner). The developing roller 31 is supported on the frame 340.

The developer container lid 321 constituting a part of the frame 340 includes circuit board positioning members 321*a* and 321*b* and circuit board fixing parts 321*c* and 321*d*, wherein an optical path guide 610 is provided at a position between the circuit board fixing parts 321*c* and 321*d* of the developer container lid 321. The optical path guide 610 includes a first light guide portion 610*a* and a second light guide portion 610*b*. The first light guide portion 610*a* extends toward the light emitting portion 510*a* (described later), and the second light guide portion 610*b* extends toward the light receiving portion 510*b* (described later). The first light guide portion 610*a* guides light emitted from the light emitting portion 510*a* into the conveyance chamber 36 of the developer container 320. The second light guide portion 610*b* guides the light having passed through the first light guide portion 610*a* and the conveyance chamber 36 to the light receiving portion 510*b*.

The circuit board positioning members 321*a* and 321*b* serving as positioning portions are arranged on outer sides of the circuit board fixing parts 321*c* and 321*d* in the longitudinal direction LD of the developer container 320, and the members 321*a* and 321*b* are boss-shaped to protrude toward a direction separating from the developer container 320. Further, the shape of the circuit board positioning members 321*a* and 321*b* is not limited to the boss shape, and it can be any arbitrary shape. Further, the longitudinal direction LD of the developer container 320 is the same as the longitudinal direction LD of the process unit 20 (refer to FIG. 5A). Fixing tools such as screws can be screw-engaged to the circuit board fixing parts 321*c* and 321*d*.

According to the present embodiment, as illustrated in FIG. 15A, the circuit board 700 and the circuit board retaining member 710 are assembled to the developer container lid 321. The circuit board retaining member 710 is assembled to the developer container lid 321 in a state sandwiched between the developer container lid 321 and the circuit board 700. That is, the circuit board retaining member 710 is disposed between the developer container lid 321 and the circuit board 700. In this state, the circuit board retaining member 710 covers a surface 510*c*, on which the light emitting portion 510*a* and the light receiving portion 510*b* are installed, of the circuit board 700. Thereby, it is possible to suppress adhesion of foreign substances such as dust or toner and to prevent a service personnel from touching to the surface 510*c*.

The circuit board 700 is disposed at a face opposed to the circuit board retaining member 710, as illustrated in FIG. 15B, and includes the light emitting portion 510*a* and the light receiving portion 510*b* for detecting the residual amount of toner in the conveyance chamber 36. According to the present embodiment, an LED is used for the light emitting portion 510*a* and a phototransistor that is turned on by receiving light from the LED is used for the light receiving portion 510*b*, but the present invention is not limited thereto. For example, a halogen lamp or a flouorescent lamp can be adopted as the light emitting portion 510*a* and a photodiode or an avalanche photodiode can be adopted as the light receiving portion 510*b*.

Further, the circuit board 700 includes positioning holes 700*a* and 700*b* to which the circuit board positioning members 321*a* and 321*b* are inserted and fixed and circuit board fixing holes 700*c* and 700*d* through which screws engageable with the circuit board fixing parts 321*c* and 321*d* can pass.

Further, the circuit board retaining member 710 similarly includes positioning holes 710*a* and 710*b* to which the circuit board positioning members 321*a* and 321*b* are inserted and fixed and circuit board fixing holes 710*c* and 710*d* through which screws engageable with the circuit board fixing parts 321*c* and 321*d* can pass. Furthermore, the circuit board retaining member 710 includes a first penetrating hole portion 711*a* in which the first light guide portion 610*a* of the optical path guide 610 is inserted and a second penetrating hole portion 711*b* in which the second light guide portion 610*b* of the optical path guide 610 is inserted. The circuit board retaining member 710 includes a first opposing surface 710*h* opposing the developer container lid 321, and a first cylindrical portion 711*c* and a second cylindrical portion 711*d* configured to extend toward the developer container lid 321 from the first opposing surface 710*k* respectively. The first penetrating hole portion 711*a* and the second penetrating hole portion 711*b* are defined by the first cylindrical portion 711*c* and the second cylindrical portion 711*d*. The circuit board retaining member 710 serving as an attachment member or a cover is brought into contact with the circuit board 700.

Light shielding plates 710*e* and 710*f* serving as shielding portions are provided on a side, of the circuit board retaining member 710, facing the circuit board 700. The light shielding plates 710*e* and 710*f* are arranged between the light emitting portion 510*a* and the light receiving portion 510*b* and are arranged close to the circuit board 700 in a state where the circuit board 700 and the circuit board retaining member 710 are assembled to the developer container lid 321.

As illustrated in FIGS. 14 through 16A, the circuit board retaining member 710 is positioned on the developer container lid 321 by having the circuit board positioning members 321*a* and 321*b* of the developer container lid 321 pass through and engage with the positioning holes 710*a* and 710*b*. Further, the circuit board 700 is positioned on the developer container lid 321 by having the circuit board positioning members 321*a* and 321*b* of the developer container lid 321 pass through and engage with the positioning holes 700*a* and 700*b*. As described, by using the circuit board positioning members 321*a* and 321*b* commonly for positioning the circuit board retaining member 710 and the circuit board 700, the developer container lid 321, the circuit board retaining member 710 and the circuit board 700 can be positioned with even higher accuracy.

Further, in a state where the circuit board retaining member 710 and the circuit board 700 are positioned on the developer container lid 321, screws are inserted to the circuit board fixing holes 700*c*, 700*d*, 710*c*, and 710*d*, and the screws are engaged with the circuit board fixing parts 321*c* and 321*d* of the developer container lid 321. Thereby, the circuit board retaining member 710 and the circuit board 700 are commonly engaged by a screw with the developer container lid 321, and the circuit board retaining member 710 and the circuit board 700 are fixed to the developer container lid 321.

As illustrated in FIGS. 14 through 16B, in a state where the circuit board retaining member 710 and the circuit board 700 are assembled to the developer container lid 321, the first light guide portion 610*a* of the optical path guide 610 is inserted to the first penetrating hole portion 711*a* of the circuit board retaining member 710. Thereby, the first light guide portion 610*a* is positioned at a position close to the light emitting portion 510*a* of the circuit board 700. Similarly, the second light guide portion 610*b* of the optical path guide 610 is inserted to the second penetrating hole portion 711*b* of the circuit board retaining member 710. Thereby, the second light guide portion 610*b* is positioned at a position close to the light receiving portion 510*b* of the circuit board 700. The first penetrating hole portion 711*a* covers a side surface 610*a*1 of the first light guide portion 610*a* inserted into the first penetrating hole portion 711*a* between the developer container lid 321 and the light emitting portion 510*a*. Similarly, the second penetrating hole portion 711*b* covers a side surface 610*b*1 of the second light guide portion 610*b* inserted into the second penetrating hole portion 711*b* between the developer container lid 321 and the light receiving portion 510*b*. Thereby, it is possible to suppress entering light other than the light emitted from the light emitting portion 510*a* into the first light guide portion 610*a* or the second light guide portion 610*b*, so that detection accuracy of the residual amount of toner can be improved.

As described, since the circuit board retaining member 710 and the circuit board 700 are positioned highly accurately on the developer container lid 321, the light emitted from the light emitting portion 510*a* is guided infallibly by the first light guide portion 610*a*. Then, the light guided by the first light guide portion 610*a* to the conveyance chamber 36 in the interior of the developer container 320 is emitted from the first light guide portion 610*a* in the longitudinal direction LD.

The light traveling through an optical path Q2 in the interior of the conveyance chamber 36 is guided to an exterior of the developing container 320 by the second light guide portion 610*b*. Since the second light guide portion 610*b* is arranged close to the light receiving portion 510*b*, the light exiting the second light guide portion 610*b* is received infallibly by the light receiving portion 510*b*. Thereby, the detection accuracy of the residual amount of toner by the light emitting portion 510*a* and the light receiving portion 510*b* can be improved.

The light shielding plates 710*e* and 710*f* are arranged at the position between the light emitting portion 510*a* and the light receiving portion 510*b* and near the circuit board 700. As shown in FIG. 15C, the circuit board retaining member 710 has a second opposing surface 710*g* opposing to the circuit board 700. The light shielding plates 710*e* and 710*f* are ribs erected from the second opposing surface 710*g* so as to approach the circuit board 700. Therefore, the light emitted from the light emitting portion 510*a* and directed toward the light receiving portion 510*b* without passing through the first light guide portion 610*a* and the second light guide portion 610*b* is shielded by the light shielding plates 710*e* and 710*f*. Especially according to the present embodiment, an LED element is used for the light emitting portion 510*a*, which has a weaker directivity compared to a shell-type LED, so that light directly traveling from the light emitting portion 510*a* to the light receiving portion 510*b* should desirably be shielded. Therefore, false detection caused by light not passing through the optical path Q2 being received by the light receiving portion 510*b* can be suppressed, and detection accuracy of the residual amount of toner by the light emitting portion 510*a* and the light receiving portion 510*b* can be improved.

Now, the arrangement of the light emitting portion 510*a* and the light receiving portion 510*b* will be described in further detail. The light emitting portion 510*a* and the light receiving portion 510*b* are arranged on a side of the side surface 36*a*, of the frame 340, that is opposite from a side of the developing roller 31 in a direction perpendicular to a longitudinal direction of the developing roller 31, as illustrated in FIGS. 16A and 16B. Further, the light emitting portion 510*a* and the light receiving portion 510*b* are arranged at the center part of the conveyance chamber 36 in the longitudinal direction LD. In further detail, the light emitting portion 510*a* and the light receiving portion 510*b* are arranged within the area AR1 that corresponds to the laser passage space SP in the longitudinal direction LD (refer to FIG. 9B). The light emitting portion 510*a* is arranged between the replenishing port 32*a* and the center 31*a* of the developing roller 31 in the longitudinal direction LD. A broken line of FIG. 16B illustrates a position corresponding to the center 31*a* of the developing roller 31. The center 31*a* of the developing roller 31 is arranged between the light emitting portion 510*a* and the light receiving portion 510*b* in the longitudinal direction LD. Since the light emitting portion 510*a* and the light receiving portion 510*b* are arranged at the center part of the conveyance chamber 36, the residual amount of toner in the conveyance chamber 36 can be detected favorably. In other words, developer, i.e., toner, may be distributed unevenly at the end portion of the conveyance chamber 36 in the longitudinal direction LD, but since uneven distribution of developer is less likely to occur at the center part of the conveyance chamber 36, the present arrangement enables to detect the actual residual amount of toner.

The method for detecting the residual amount of toner can be similar to the method disclosed in the first embodiment with reference to FIGS. 10 through 13. As illustrated in FIG. 16A, the optical path Q2 is set so as to overlap with the rotation trajectory T of the agitation member 34 when viewed in the axial direction of the rotation shaft of the agitation member 34. In other words, the light emitted from the light emitting portion 510*a* passes through the interior of the conveyance chamber 36 within the rotation trajectory of the agitation member 34 when viewed in the axial direction of the agitation member 34. Then, the time during which the optical path Q2 is blocked by toner conveyed by the agitation member 34, that is, the time during which the light receiving portion 51*b* does not detect light from the light emitting portion 51*a*, while the agitation member 34 rotates once varies depending on the residual amount of toner. Further, the light intensity of light received by the light receiving portion 51*b* also varies depending on the residual amount of toner. Thereby, the control unit 90 can determine the level of residual amount of toner.

For example, as illustrated in FIG. 17A, in a state where the amount of toner within the conveyance chamber 36 of the developer container 320 is very small, the time during which the light receiving portion 510*b* receives light becomes long and the light intensity of light received by the light receiving portion 510*b* becomes strong, so it is determined that the residual amount of toner is small. Meanwhile, as illustrated in FIG. 17B, in a state where the amount of toner within the conveyance chamber 36 of the developer container 320 is large, the time during which the light receiving portion 510*b* receives light becomes short, and the light intensity of light received by the light receiving portion 510*b* becomes weak, so it is determined that the residual amount of toner is large. The display of the level of residual amount of toner using the toner residual amount panel 400 is carried out in the manner described with reference to FIGS. 13A through 13D.

As described, according to the present embodiment, the circuit board retaining member 710 and the circuit board 700 are attached to the process unit 20 including the developer container 320, or the conveyance chamber 36, storing toner, and the circuit board 700 is provided with the light emitting portion 510*a* and the light receiving portion 510*b*. Therefore, the relative position of the optical path Q2 in the conveyance chamber 36 becomes fixed, so that the residual amount of toner can be detected stably regardless of the positional accuracy of the process unit 20 on the printer body 100.

Further, since the relative position of the optical path Q2 in the conveyance chamber 36 becomes fixed, there is no need to take into consideration the misregistration of the conveyance chamber 36 and the optical path Q2 in advance when designing the light emitting portion 510*a*, the light receiving portion 510*b* and the developer container 320. Therefore, there is no need to select the optical element by providing a margin in the light amount of the light emitting portion 510*a*, so that the freedom of design of the light emitting portion 510*a*, the light receiving portion 510*b* and the developer container 32 can be improved and costs can be cut down.

Furthermore, since the circuit board positioning members 321*a* and 321*b* provided on the developer container lid 321 can be used in common for determining the positions of the circuit board retaining member 710 and the circuit board 700, the positioning of the developer container lid 321, the circuit board retaining member 710 and the circuit board 700 can be performed with even higher accuracy.

Since the first light guide portion 610*a*, the second light guide portion 610*b*, and the circuit board retaining member 710 including the light shielding plates 710*e* and 710*f* are positioned between the developer container lid 321 and the circuit board 700, it becomes possible to reduce the possibility of light that has not passed through the optical path Q2 being received by the light receiving portion 510*b*. Therefore, false detection by the light receiving portion 510*b* can be suppressed, and the detection accuracy of the residual amount of toner by the light emitting portion 510*a* and the light receiving portion 510*b* can be improved.

Further, the light emitting portion 510*a* and the light receiving portion 510*b* according to the present embodiment is arranged in an aligned manner along the longitudinal direction LD of the process unit 20, and arranged on the same side, i.e., front side, of the conveyance chamber 36 when viewed in the longitudinal direction LD. Therefore, the light emitting portion 51*a* and the light receiving portion 51*b* can be arranged in a compact manner. Further, since the light emitting portion 510*a* and the light receiving portion 510*b* are disposed collectively on the circuit board 700, power can be supplied easily to the light emitting portion 510*a* and the light receiving portion 510*b* and communication through signals with the light emitting portion 510*a* and the light receiving portion 510*b* can be performed easily. Therefore, the process unit 20 can be downsized. A connector is provided on the circuit board 700, and the control unit 90 provided on the printer body 100 and the connector are connected via a cable. In a case where the process unit 20 is attached to or detached from the printer body 100, the cable and the connector are attached or detached.

Other Embodiments

According to the first embodiment described above, the toner residual amount sensor 51 including the light emitting portion 51*a* and the light receiving portion 51*b* were provided on the developing apparatus 30, but the light emitting portion 51*a* and the light receiving portion 51*b* can be provided on the circuit board instead.

According to the second embodiment described above, the circuit board retaining member 710 was provided between the developer container lid 321 and the circuit board 700, but the present invention is not limited thereto. That is, the circuit board 700 can be attached directly to the developer container lid 321 without providing the circuit board retaining member 710.

According further to the second embodiment, the circuit board positioning members 321*a* and 321*b* were provided on the developer container lid 321 and the circuit board positioning members 321*a* and 321*b* were engaged to positioning holes 710*a* and 710*b* of the circuit board retaining member 710 and positioning holes 700*a* and 700*b* of the circuit board 700, but the present invention is not limited thereto. For example, it is possible to have boss-shaped positioning portions protrude through both side faces of the circuit board retaining member 710 which are engaged with holes provided on each of the developer container lid 321 and the circuit board 700. For example, it is possible to provide boss-shaped positioning portions on the circuit board 700 and have holes formed on the developer container lid 321 and the circuit board retaining member 710 respectively engage with the positioning portions. In any case, the method for positioning the circuit board 700 on the process unit 20, the position of the circuit board 700, and the method or position of fixture are not limited.

Further, in all the aforementioned embodiments, the light emitting portion and the light receiving portion are arranged in an aligned manner along the longitudinal direction LD, but the arrangement is not limited thereto. The light emitting portion and the light receiving portion can be arranged at any position as long as they are positioned on the side face of the conveyance chamber 36 opposite from the developing roller 31.

In all the aforementioned embodiments, the optical paths Q1 and Q2 are arranged at a position overlapped with the rotation trajectory T of the agitation member 34 when viewed in the axial direction of the agitation member 34, but the present invention is not limited thereto. That is, the optical paths Q1 and Q2 can be arranged so as not to overlap with the rotation trajectory T of the agitation member 34.

In all the aforementioned embodiments, the reading unit 200 was provided above the printer body, but the present invention is not limited thereto. That is, the image forming apparatus can be a printer without a reading unit. Further, the reading unit may be a reading unit equipped with an ADF (Auto Document Feeder) for feeding documents.

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2020-218238, filed Dec. 28, 2020, which is hereby incorporated by reference herein in its entirety.

What is claimed is:

1. An image forming apparatus comprising:
- an apparatus body;
- an image bearing member on which an image is formed; and
- a process unit attached to the apparatus body, the process unit including:
  - a frame including a storage portion configured to store developer;
  - a developer bearing member configured to bear the developer and to supply the developer to the image bearing member to develop an electrostatic latent image, the developer bearing member being supported by the frame; and
  - a circuit board attached to the frame,
- wherein the circuit board includes:
  - a light emitting portion configured to emit light; and
  - a light receiving portion configured to receive the light emitted from the light emitting portion and having passed through an interior of the storage portion, the light emitting portion and the light receiving portion being provided at a center portion of the storage portion of the frame with respect to a longitudinal direction of the developer bearing member.

2. The image forming apparatus according to claim 1, wherein the process unit further includes:
- an attachment member attached to the frame so as to be disposed between the circuit board and the frame;
- a first light guide portion configured to guide the light emitted from the light emitting portion to the interior of the storage portion, the first light guide portion being provided on the frame;
- a second light guide portion configured to guide the light, having passed through the first light guide portion and the interior of the storage portion, to the light receiving portion, the second light guide portion being provided on the frame; and
- a positioning portion configured to position the attachment member and the circuit board by engaging with the attachment member and the circuit board, the positioning portion being provided on the frame, and
- wherein the attachment member includes:
  - a first penetrating hole portion in which the first light guide portion is inserted; and
  - a second penetrating hole portion in which the second light guide portion is inserted.

3. The image forming apparatus according to claim 2, wherein the attachment member covers a surface, on which the light emitting portion and the light receiving portion are installed, of the circuit board, and
- wherein the attachment member and the circuit board are commonly engaged by a screw with the frame.

4. The image forming apparatus according to claim 2, wherein the attachment member includes a shielding portion arranged between the light emitting portion and the light receiving portion, the shielding portion being configured to shield the light emitted from the light emitting portion and directed toward the light receiving portion without passing through the first light guide portion and the second light guide portion.

5. The image forming apparatus according to claim 4, wherein the attachment member includes an opposing surface opposing the circuit board, and
- wherein the shielding portion is a rib erected from the opposing surface so as to approach the circuit board.

6. The image forming apparatus according to claim 1, wherein the light emitting portion and the light receiving portion are arranged on a side of a surface, of the frame, that is opposite from a side of the developer bearing member in a direction perpendicular to the longitudinal direction of the developer bearing member.

7. The image forming apparatus according to claim 1, wherein the light emitting portion and the light receiving portion are arranged in an aligned manner along the longitudinal direction of the developer bearing member.

8. The image forming apparatus according to claim 7, wherein the process unit includes an agitation member configured to agitate the developer stored in the storage portion by being rotated, and
- wherein the longitudinal direction is parallel to an axial direction of a rotation shaft of the agitation member.

9. The image forming apparatus according to claim 8, wherein the light emitted from the light emitting portion passes through the interior of the storage portion within a rotation trajectory of the agitation member when viewed in the axial direction.

10. The image forming apparatus according to claim 1, wherein the process unit further includes a replenishing port to which a replenishing container storing the developer is detachably attached and through which the developer is replenished from the replenishing container to the storage portion.

11. The image forming apparatus according to claim 10, wherein the light emitting portion is arranged between the replenishing port and a center of the developer bearing member with respect to the longitudinal direction of the developer bearing member.

12. The image forming apparatus according to claim 1, wherein the process unit includes the image bearing member.

13. The image forming apparatus according to claim 1, wherein the process unit includes only one light emitting portion and only one light receiving portion.

14. An image forming apparatus comprising:

(i) an apparatus body;

(ii) an image bearing member on which an image is formed; and (iii) a process unit attached to the apparatus body, the process unit including:

(iii-i) a frame including a storage portion configured to store developer;

(iii-ii) a developer bearing member configured to bear the developer and to supply the developer to the image bearing member to develop an electrostatic latent image, the developer bearing member being supported by the frame;

(iii-iii) a light emitting portion configured to emit light, the light emitting portion being one of an LED, a halogen lamp, and a fluorescent lamp; and (iii-iv) a light receiving portion configured to receive light emitted from the light emitting portion and having passed through an interior of the storage portion, the light receiving portion being one of a phototransistor and a photodiode, wherein the light emitting portion and the light receiving portion are supported by the frame and are arranged on a side of a surface, of the frame, that is opposite from a side of the developer bearing member in a direction perpendicular to a longitudinal direction of the developer bearing member, the light emitting portion and the light receiving portion being provided at a center portion of the storage portion of the frame with respect to the longitudinal direction of the developer bearing member.

15. The image forming apparatus according to claim 14, wherein the light emitting portion and the light receiving portion are arranged in an aligned manner along the longitudinal direction of the developer bearing member.

16. The image forming apparatus according to claim 15, wherein the process unit includes an agitation member configured to agitate the developer stored in the storage portion by being rotated, and wherein the longitudinal direction is parallel to an axial direction of a rotation shaft of the agitation member.

17. The image forming apparatus according to claim 16, wherein the light emitted from the light emitting portion passes through the interior of the storage portion within a rotation trajectory of the agitation member when viewed in the axial direction.

18. The image forming apparatus according to claim 14, wherein the process unit further includes a replenishing port to which a replenishing container storing the developer is detachably attached and through which the developer is replenished from the replenishing container to the storage portion.

19. The image forming apparatus according to claim 18, wherein the light emitting portion is arranged between the replenishing port and a center of the developer bearing member with respect to the longitudinal direction of the developer bearing member.

20. The image forming apparatus according to claim 14, wherein the process unit further includes the image bearing member.

21. The image forming apparatus according to claim 14, wherein the process unit includes only one light emitting portion and only one light receiving portion.

22. A process unit used in an image forming apparatus, the process unit comprising:

a frame including a storage portion configured to store developer;

a developer bearing member configured to bear the developer, the developer bearing member being supported by the frame; and a circuit board attached to the frame, wherein the circuit board includes:

a light emitting portion configured to emit light; and a light receiving portion configured to receive the light emitted from the light emitting portion and having passed through an interior of the storage portion, the light emitting portion and the light receiving portion being provided at a center portion of the storage portion of the frame with respect to a longitudinal direction of the developer bearing member.

23. A process unit used in an image forming apparatus, the process unit comprising:

a frame including a storage portion configured to store developer;

a developer bearing member configured to bear the developer, the developer bearing member being supported by the frame;

a light emitting portion configured to emit light, the light emitting portion being one of an LED, a halogen lamp, and a fluorescent lamp; and a light receiving portion configured to receive light emitted from the light emitting portion and having passed through an interior of the storage portion, the light receiving portion being one of a phototransistor and a photodiode, wherein the light emitting portion and the light receiving portion are supported by the frame and are arranged on a side of a surface, of the frame, that is opposite from a side of the developer bearing member in a direction perpendicular to a longitudinal direction of the developer bearing member, the light emitting portion and the light receiving portion being provided at a center portion of the storage portion of the frame with respect to the longitudinal direction of the developer bearing member.

* * * * *